(12) United States Patent
Zhang et al.

(10) Patent No.: US 11,984,250 B2
(45) Date of Patent: May 14, 2024

(54) MULTI-WINDING INDUCTOR AND POWER SUPPLY MODULE

(71) Applicant: Delta Electronics (Shanghai) CO., LTD, Shanghai (CN)

(72) Inventors: Mingzhun Zhang, Shanghai (CN); Jinping Zhou, Shanghai (CN); Min Zhou, Shanghai (CN); Shouyu Hong, Shanghai (CN); Qingdong Chen, Shanghai (CN)

(73) Assignee: Delta Electronics (Shanghai) CO., LTD, Shanghai (CN)

(*) Notice: Subject to any disclaimer, the term of this patent is extended or adjusted under 35 U.S.C. 154(b) by 268 days.

(21) Appl. No.: 17/684,459

(22) Filed: Mar. 2, 2022

(65) Prior Publication Data

US 2022/0285075 A1    Sep. 8, 2022

(30) Foreign Application Priority Data

Mar. 4, 2021    (CN) .......................... 202110239526.5

(51) Int. Cl.
     *H01F 27/28*      (2006.01)
     *H01F 27/02*      (2006.01)
     (Continued)

(52) U.S. Cl.
     CPC ........... *H01F 27/263* (2013.01); *H01F 27/02* (2013.01); *H01F 27/24* (2013.01);
     (Continued)

(58) Field of Classification Search
     CPC .. H02M 1/0064; H02M 3/003; H02M 3/1584; H02M 3/1586
     See application file for complete search history.

(56) References Cited

U.S. PATENT DOCUMENTS 8,174,348 B2    5/2012   Ikriannikov et al.
8,975,995 B1    3/2015   Ikriannikov et al.
(Continued)

FOREIGN PATENT DOCUMENTS

CN      103141021 B    9/2015
CN      105097227 A    11/2015
(Continued)

OTHER PUBLICATIONS

Extended European Search Report dated Aug. 5, 2022 of European Application No. 22159639.8.
(Continued)

*Primary Examiner* — Jue Zhang
(74) *Attorney, Agent, or Firm* — Qinghong Xu

(57) ABSTRACT

A multi-winding inductor includes a magnetic core including three magnetic columns and two windings. Each winding includes a first, a second and a third portions. The first magnetic column is arranged between the first portion of the first winding and the first portion of the second winding; the second magnetic column is arranged on one side of the first portion of the first winding and the third portion of the second winding; and the third magnetic column is arranged between the third portion of the first winding and the third portion of the second winding. The first and the second portions of two windings respectively form pins on opposite sides of the magnetic core.

20 Claims, 19 Drawing Sheets

(51) Int. Cl.
    *H01F 27/24*     (2006.01)
    *H01F 27/26*     (2006.01)
    *H02M 3/00*     (2006.01)
    *H02M 3/158*     (2006.01)
    *H02M 1/00*     (2006.01)
    *H02M 3/04*     (2006.01)

(52) U.S. Cl.
    CPC ........ *H01F 27/2823* (2013.01); *H02M 3/003* (2021.05); *H02M 1/0064* (2021.05); *H02M 3/04* (2013.01); *H02M 3/1586* (2021.05)

(56) References Cited

U.S. PATENT DOCUMENTS

| | | |
|---|---|---|
| 9,263,177 B1 | 2/2016 | Ikriannikov et al. |
| 9,336,941 B1 | 5/2016 | Ikriannikov |
| 10,256,031 B2* | 4/2019 | Baker ................... H01F 27/306 |
| 2008/0265858 A1* | 10/2008 | Muratov ............. H02M 3/1584 |
| | | 323/301 |
| 2010/0013587 A1* | 1/2010 | Yan ........................ H01F 17/04 |
| | | 29/606 |
| 2010/0060404 A1* | 3/2010 | Raiser ................... H01F 27/346 |
| | | 336/212 |
| 2011/0279100 A1 | 11/2011 | Ikriannikov et al. |
| 2017/0047155 A1 | 2/2017 | Yao et al. |
| 2019/0019610 A1 | 1/2019 | Lu et al. |
| 2019/0378643 A1 | 12/2019 | Zhou et al. |

FOREIGN PATENT DOCUMENTS

| | | |
|---|---|---|
| CN | 107046366 A | 8/2017 |
| CN | 111899962 A | 11/2020 |

OTHER PUBLICATIONS

Extended European Search Report dated Aug. 17, 2022 of European Application No. 22159751.1.
Extended European Search Report dated Aug. 17 of European Application No. 22159645.5.

* cited by examiner

MULTI-WINDING INDUCTOR AND POWER SUPPLY MODULE

CROSS REFERENCE

This application is based upon and claims priority to Chinese Patent Application No. 202110239526.5, filed on Mar. 4, 2021, the entire contents thereof are incorporated herein by reference.

TECHNICAL FIELD

This disclosure relates to a power supply module and a multi-winding inductor.

BACKGROUND

In recent years, with the development of the technologies such as data center, artificial intelligence, the working speed of a central processor unit (CPU), a graphic processor unit (GPU) and various integrated chips (IC) is getting faster, and the working current is getting greater, the power supply modules for supplying power to these equipment, such as a voltage regulation module (VRM), have increasingly stringent requirements on power density, efficiency, and dynamic performance, an extremely great challenge is proposed to the design of the VRM.

In the voltage regulation module, a volume of multi-winding inductor usually has the highest proportion, and an inductance amount of multi-winding inductor is also a main factor that directly affects efficiency and dynamic performance of the whole VRM. With the increasing of the power density of the VRM, the volume of the VRM becomes smaller, an extremely great challenge is proposed to the design for heat dissipation of the VRM, which even becomes a bottleneck in the technical development of the VRM.

As shown in FIG. 1, FIG. 1 is the schematic structural view of a VRM as disclosed in Chinese patent application CN107046366A. In the VRM structure shown in FIG. 1, a switching unit 21 as heat source is arranged over the multi-winding inductor 10. A coil 13 of the winding inductor coil 13 has one end arranged on an upper surface of the multi-winding inductor 10 and connected to the switching unit 21, and the other end arranged on a lower surface of the multi-winding inductor 10, for connecting to a load. Such arrangement is provided such that the switching unit 21 including the heat source is directly connected to a heat sink (not shown) above, thereby maximizing the heat dissipation capability of the VRM.

In the structure shown in FIG. 1, although the inductor can meet the requirements of leading out PIN on upper and lower sides at the same time, the inductor cannot achieve negative coupling. The negative coupling inductor technology can provide a small dynamic sensitivity to meet the high dynamic performance, and the negative coupling inductor can provide a large steady-state sensitivity to achieve high efficiency. Therefore, where the inductor realizes the negative coupling on the basis of leading out the PIN on the upper and lower sides is a hot and difficult problem in the field of VRM.

SUMMARY

According to one aspect of this disclosure, a multi-winding inductor includes a magnetic core and a winding assembly. The magnetic core includes a first cover plate, a second cover plate, a first magnetic column, a second magnetic column and a third magnetic column. The first cover plate and the second cover plate are arranged oppositely The first magnetic column, the second magnetic column and the third magnetic column are orderly arranged counterclockwise, and two ends of each of the first magnetic column, the second magnetic column and the third magnetic column are respectively connected to the first cover plate and the second cover plate. The winding assembly including a first winding and a second winding; each of the first winding and the second winding including a first portion, a second portion and a third portion. Wherein the first portion and the third portion are connected through the second portion of each of the first winding and the second winding. The first magnetic column is arranged between the first portion of the first winding and the first portion of the second winding; the second magnetic column is arranged on one side of the first portion of the first winding and the third portion of the second winding; and the third magnetic column is arranged between the third portion of the first winding and the third portion of the second winding. Wherein the first portion of the first winding extends to a first surface of the magnetic core and forms a first pin of the inductor on the first surface of the magnetic core; the third portion extends to a second surface of the magnetic core and forms a second pin of the inductor on the second surface of the magnetic core; the first portion of the second winding extends to the first surface of the magnetic core and forms a third pin of the inductor on the first surface of the magnetic core; the third portion extends to the second surface of the magnetic core and forms a fourth pin of the inductor on the second surface of the magnetic core; and the first surface and the second surface of the magnetic core are arranged oppositely.

According to one implementation of this disclosure, the first winding is provided with a notch or a hole, the second winding is provided with a notch or a hole, the first winding and the second winding are arranged crosswise through the notch or the hole such that the second portion of the first winding and the second portion of the second winding are overlapped.

According to one implementation of this disclosure, the multi-winding inductor further includes a fourth magnetic column, two ends of which are respectively connected with the first cover plate and the second cover plate; and the fourth magnetic column are arranged on one side of the third portion of the first winding and the first portion of the second winding.

According to one implementation of this disclosure, the first magnetic column, the first cover plate, the third magnetic column and the second cover plate form a first magnetic path; the first cover plate, the second magnetic column, the second cover plate and the fourth magnetic column form a second magnetic path; and a total reluctance of the first magnetic path is less than a total reluctance of the second magnetic path.

According to one implementation of this disclosure, the first magnetic column, the first cover plate, the third magnetic column and the second cover plate form a first magnetic path; the first cover plate, the second magnetic column, the second cover plate and the fourth magnetic column form a second magnetic path; and a total reluctance of the first magnetic path is greater than a total reluctance of the second magnetic path.

According to one implementation of this disclosure, the first magnetic column, the first cover plate, the third magnetic column and the second cover plate form a first magnetic path; the first cover plate, the second magnetic column, the second cover plate and the fourth magnetic column form a second magnetic path; and a total reluctance of the first magnetic path is equal to a total reluctance of the second magnetic path.

According to one implementation of this disclosure, a total length of air gaps in the first magnetic path is less than a total length of air gaps in the second magnetic path.

According to one implementation of this disclosure, a magnetic permeability of at least part of a magnetic material in the second magnetic column and the fourth magnetic column is lower than a magnetic permeability of a magnetic material in the first magnetic column and the third magnetic column.

According to one implementation of this disclosure, the magnetic core is formed by one magnetic material, and a ratio of an equivalent magnetic path length to an equivalent magnetic sectional area of the first magnetic path is less than a ratio of an equivalent magnetic path length to an equivalent magnetic sectional area of the second magnetic path.

According to one implementation of this disclosure, the first winding and the second winding are a flat wire with a width and a thickness, the thickness is less than the width, wherein the width direction is parallel to an extension direction of the first magnetic column.

According to another aspect of this disclosure, a power supply module includes the multi-winding inductor of this disclosure; and an integrated power module stacked on a first surface of the multi-winding inductor and including at least a first switching unit and a second switching unit. Wherein the first switching unit is electrically connected with the first pin of the multi-winding inductor, and the second switching unit is electrically connected with the third pin of the multi-winding inductor.

According to one implementation of this disclosure, the first switching unit and the second switching unit have a rectangular shape, a length direction of the first switching unit and a length direction of the second switching unit are in consistent with a width direction of the first winding and a width direction of the second winding, and the width direction of the first winding and the width direction of the second winding are parallel to an extension direction of the magnetic column.

According to one implementation of this disclosure, the power supply module further comprises a plurality of conductive elements arranged around the magnetic core, each of the conductive elements includes a first end and a second end, the first end forms a fifth pin on the first surface of the magnetic core, and the second end forms a sixth pin on the second surface of the magnetic core.

According to one implementation of this disclosure, the plurality of conductive elements includes at least two groups of power connection assemblies that are respectively arranged on a first side and a second side of the multi-winding inductor, wherein the first side and the second side are arranged oppositely; and a signal connection assembly arranged on a third side and/or a fourth side of the multi-winding inductor. Wherein the signal connection assembly comprises a plurality of signal conductive elements arranged side by side.

According to one implementation of this disclosure, each group of the power connection assemblies contains an input conductive element and a ground conductive element; each of the input conductive element and the ground conductive element includes a first portion, a second portion and a third portion orderly connected; wherein the second portion is arranged on a side of the multi-winding inductor, and the first portion and the third portion extend to the first surface and the second surface of the multi-winding inductor, respectively. Wherein the input conductive element and the ground conductive element of each group of the power connection assemblies are arranged side by side.

According to one implementation of this disclosure, the input conductive element and the ground conductive element each include at least one first portion and at least one third portion; the first portions of the input conductive element and the ground conductive element of each group of the power connection assemblies are staggered; the third portions of the input conductive element and the ground conductive element of each group of the power connection assemblies are staggered; and the second portions of the input conductive element and the ground conductive element of each group of the power connection assemblies are overlapped.

According to one implementation of this disclosure, each group of the power connection assemblies comprises at least two input conductive elements and at least two ground conductive elements. Each of the input conductive elements and the ground conductive elements includes at least two first portions, one second portion and at least two third portions, and the at least two first portions and the at least two third portions are respectively extending from two ends of the second portion. Wherein the second portions of the at least two input conductive elements and the second portions of the at least two ground conductive elements are alternately overlapped on the side of the multi-winding inductor, the first portions respectively extend to the first surface of the multi-winding inductor, and the third portions respectively extend to the second surface of the multi-winding inductor. The at least two first portions of the input conductive element and at least two first portions of the ground conductive element adjacent thereto are staggered; and the at least two third portions of the input conductive element and at least two third portions of the ground conductive element adjacent thereto are staggered.

According to one implementation of this disclosure, the power supply module further includes a bendable substrate, on which the plurality of conductive elements is arranged.

According to one implementation of this disclosure, the bendable substrate comprises a bottom plate, a first side plate, a second side plate and a third side plate, and, the first side plate, the second side plate and the third side plate are formed by bending and extending the bottom plate, wherein the first side plate and the second side plate are arranged oppositely; wherein the plurality of conductive elements comprises a signal connection assembly and at least two groups of power connection assemblies, the at least two groups of power connection assemblies are respectively arranged on the first side plate and the second side plate, and the signal connection assembly is arranged on the third side plate.

According to one implementation of this disclosure, the power supply module further comprises an output capacitor arranged on the bottom plate and located between the second surface of the magnetic core and the bottom plate.

BRIEF DESCRIPTION OF THE DRAWINGS

The above and other features and advantages of this disclosure will become more apparent from the following detailed description of embodiments thereof, when considered in conjunction with the accompanying drawings.

FIG. 3b is an exploded view of the power supply module as shown in FIG. 3a;

FIG. 3c is an exploded view of a multi-winding inductor in the power supply module as shown in FIG. 3a;

FIG. 5a is a schematic structural view of a winding of the multi-winding inductor in FIG. 3a;

FIG. 5b is a top view of FIG. 5a;

FIG. 7b is an exploded view of FIG. 7a;

FIG. 7c is the exploded view of the multi-winding inductor in FIG. 7a.

FIG. 9b is an exploded view of FIG. 9a;

FIG. 9c is the exploded view of the multi-winding inductor in FIG. 9a.

FIG. 10b is a perspective view of the multi-winding inductor as shown in FIG. 10a;

FIG. 11b is an exploded view of FIG. 11a;

FIG. 11c is an exploded view of a first power connection assembly in the power supply module in FIG. 11a.

FIG. 11d is an exploded view of a second power connection assembly in the power supply module in FIG. 11a.

FIG. 12b is an exploded view of FIG. 12a;

FIG. 12c is an exploded view of the first power connection assembly in the power supply module in FIG. 12a.

FIG. 12d is an exploded view of the second power connection assembly in the power supply module in FIG. 12a.

FIG. 13b is a sectional view taken along a line D-D in FIG. 13a;

FIG. 13c is a schematic structural view of a bendable substrate without being bent in FIG. 13a.

FIG. 13d is a schematic structural view at another angle of a bendable substrate without being bent in FIG. 13a.

DETAILED DESCRIPTION

Figure 1:
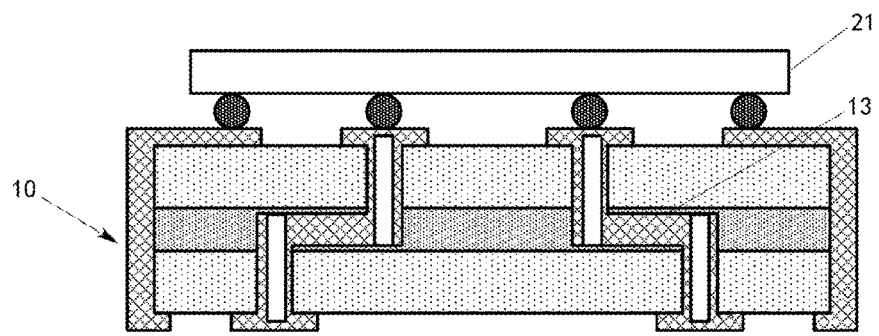
FIG. 1 is a schematic structural view of a VRM in prior art.

Now, the exemplary implementations will be described more completely with reference to the accompanying drawings. However, the exemplary implementations can be made in various forms and should not be construed as limiting the implementations as set forth herein. Instead, these implementations are provided so that the present disclosure will be thorough and complete, and concept of the exemplary implementation will be completely conveyed to a person skilled in the art. Same reference numbers denote the same or similar structures in the drawings, thereby omitting the detailed description thereof.

The First Embodiment

Figure 2:
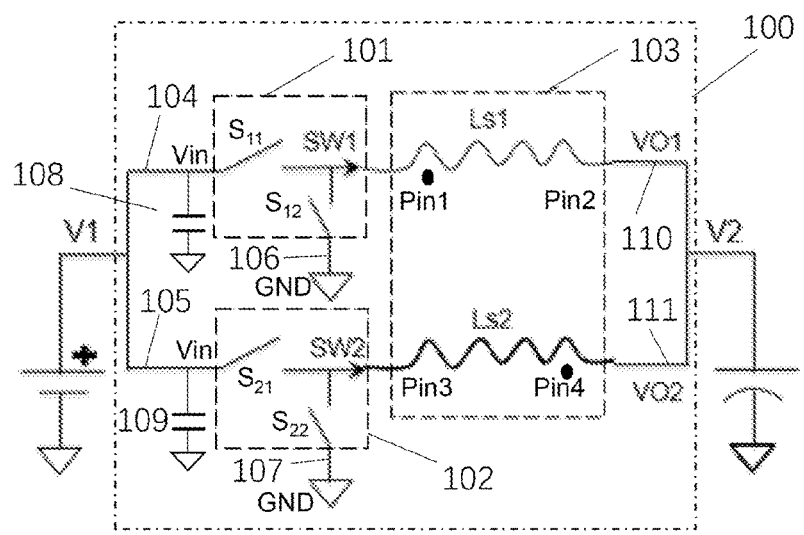
FIG. 2 is shows a schematic view of a circuit topology principle of the two-phase VRM.

As shown in FIG. 2, FIG. 2 is a schematic view of a circuit topology principle of the two-phase VRM. A VRM 100 includes a first switching unit 101, a second switching unit 102, a two-phase negative coupling inductor 103, input connecting wires 104, 105, ground connecting wires 106, 107, input capacitors 108, 109, and output power connecting wires 110, 111. The input connecting wires 104, 105 are connected to an input voltage end V1 to receive an input voltage, and are connected to Vin ends of the switching units 101, 102. The ground connecting wires 106, 107 are connected to the GND ends of the switching units 101, 102. The first switching unit 101 includes two switching devices S11, S12. The two switching devices S11, S12 are connected to a node SW1, and the node SW1 is connected with a first pin (i.e., an input pin, pin1) of the negative coupling inductor. The second switching unit 102 includes two switching devices S21, S22. The two switching devices S21, S22 are connected to a node SW2, and the node SW2 is connected with a third pin pin3 of the negative coupling inductor. The first pin pin1 and the third pin pin3 of the negative coupling inductor 103 are terminals of different magnetic polarity. A second pin pin2 and a fourth pin pin4 of the negative coupling inductor 103 are connected to a load directly or through the output power connecting wires 110, 111, for providing an output voltage V2 for the load.

Figure 3A:
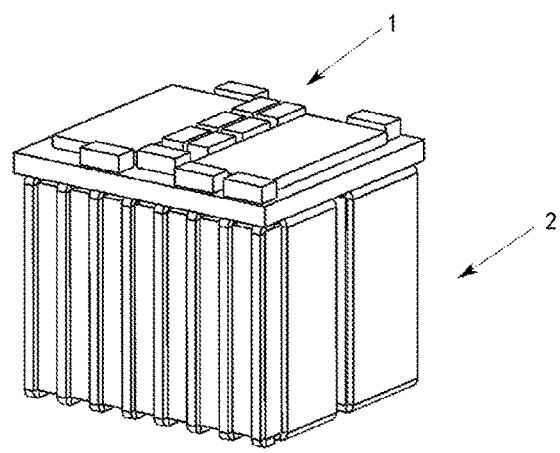
FIG. 3a is a schematic structural view of a power supply module according to a first embodiment of this disclosure.
Figure 3B:
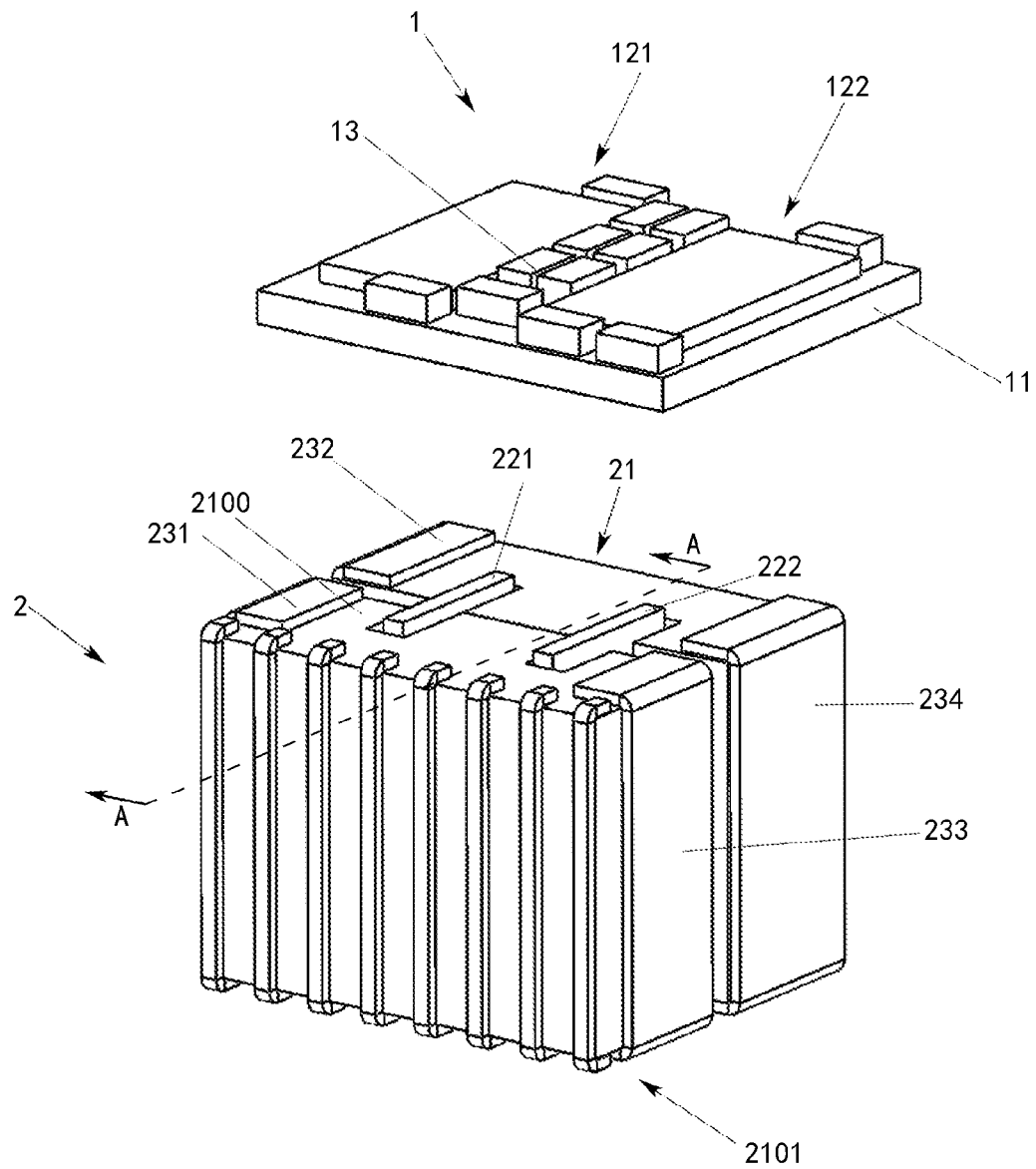

Referring to FIGS. 3a and 3b, FIG. 3a is a schematic structural view of a power supply module according to the first embodiment of this disclosure. FIG. 3b is an exploded view of the power supply module as shown in FIG. 3a. FIGS. 3a and 3b show the power supply module according to the first embodiment of this disclosure, and the power supply module includes an integrated power module (IPM) 1, a multi-winding inductor 2 and a plurality of conductive elements. An integrated power module 1 is stacked on a first surface, for example an upper surface of the multi-winding inductor 2 and contains a printed circuit board 11, a first switching unit 121, a second switching unit 122 and a capacitor 13.

Figure 3C:
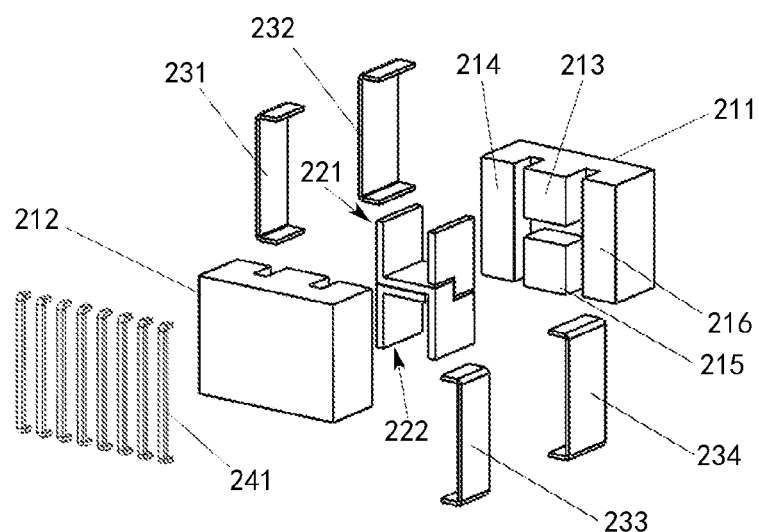

Further, referring to FIG. 3c, FIG. 3 is an exploded view of the multi-winding inductor as shown in FIG. 3a. The multi-winding inductor 2 of this disclosure includes a magnetic core 21, a first winding 221 and a second winding 222. The magnetic core 21 includes a first cover plate 211 and a second cover plate 212 which are arranged oppositely, a first magnetic column 213, a second magnetic column 214, a third magnetic column 215 and a fourth magnetic column 216. The first cover plate 211 and the second cover plate 212 are connected with the first magnetic column 213, the second magnetic column 214, the third magnetic column 215 and the fourth magnetic column 216, respectively.

As shown in FIG. 3c, the first magnetic column 213, the second magnetic column 214, the third magnetic column 215, and the fourth magnetic column 216 each is divided into two symmetric portions by an air gap. The first portions of the first magnetic column 213, the second magnetic column 214, the third magnetic column 215, and the fourth magnetic column 216 are connected with the cover plate 211, to form one double-central column E type magnetic core. The second portions of the first magnetic column 213, the second magnetic column 214, the third magnetic column 215 and the fourth magnetic column 216 are connected with the cover plate 212, to form another double-central column E type magnetic core. Therefore, the magnetic core in the first embodiment is double-central column EE type magnetic core.

Figure 3D:
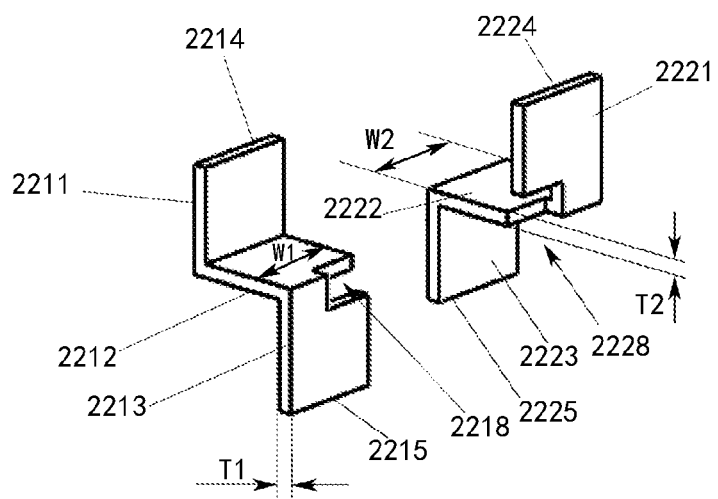
FIG. 3d is an exploded view of a first winding and a second winding in the multi-winding inductor as shown in FIG. 3c.

FIG. 3d is an exploded view of the first winding 221 and the second winding 222 in the multi-winding inductor as shown in FIG. 3c. As shown in FIGS. 3b, 3c, and 3d, the first winding 221 includes a first portion 2211, a second portion 2212, and a third portion 2213 connected in sequence. The first portion 2211 of the first winding 221 is arranged between the first magnetic column 213 and the second magnetic column 214. The second portion 2212 of the first winding 221 is arranged between the first magnetic column 213 and the third magnetic column 215. The third portion 2213 of the first winding 221 is arranged between the third magnetic column 215 and the fourth magnetic column 216. The first portion 2211 of the first winding 221 extends to a first surface 2100 of the magnetic core and forms a first pin 2214 of the multi-winding inductor on the first surface 2100 of the magnetic core. The third portion 2213 of the first winding 221 extends to a second surface 2101 of the magnetic core and forms a second pin 2215 of the multi-winding inductor on the second surface 2101 of the magnetic core. The first surface 2100, for example, may be a top surface of the magnetic core, and the second surface 2101, for example, may be a bottom surface of the magnetic core.

The second winding 222 includes a first portion 2221, a second portion 2222 and a third portion 2223 connected in sequence. The first portion 2221 of the second winding 222 is arranged between the first magnetic column 213 and the fourth magnetic column 216. The second portion 2222 of winding 222 is arranged between the first magnetic column 213 and the third magnetic column 215. The third portion 2223 of the second winding 222 is arranged between the third magnetic column 215 and the second magnetic column 214. The first portion 2221 of the second winding 222 extends to the first surface 2100 of the magnetic core and forms a third pin 2224 of the multi-winding inductor on the first surface 2100. The third portion 2223 of the second winding extends to the second surface 2101 of the magnetic core and forms a fourth pin 2225 of the multi-winding inductor on the second surface 2101.

As shown in FIG. 3d, a bayonet 2218 is arranged on the first winding 221, and a bayonet 2228 is arranged on the corresponding position of the second winding 222. The bayonets are provided on the two windings such that the two windings are arranged crosswise and assembled in an overlapped manner. In other embodiments, holes may be provided on the first winding 221 and the second winding 222 such that the two windings are arranged crosswise and assembled in an overlapped manner. The windings are arranged crosswise, so that the second portions of the two windings are overlapped together, to reduce a length of a magnetic path generated by the current in the second portions of the two windings, and enhance the performance of coupling.

As shown in FIG. 3d, the first winding and the second winding each is a copper flat conductive element with a width and a thickness. The width W1 of the first winding 221 is greater than the thickness T1 thereof. Similarly, the width W2 of the second winding is greater than the thickness T2 thereof. A width direction is parallel to the extension direction of the first magnetic column 213 from the first cover plate 211 to the second cover plate 212, that is, a height direction of the magnetic core.

As shown in FIG. 3b and FIG. 3d, in the first embodiment, the first pin 2214 and the third pin 2224 of the multi-winding inductor are arranged on the first surface 2100 of the magnetic core, for example, on the upper surface of the multi-winding inductor. The first pin 2214 is connected with a pad of the first switching unit 121 in the integrated power module (corresponding to a node SW1 in FIG. 2); and the third pin 2224 is connected with a pad of the second switching unit 122 in the integrated power module (corresponding to a node SW2 in FIG. 2), as such, a connection path between the switching unit and the winding of multi-winding inductor is shortest, which is beneficial to reduce impedance and improve efficiency.

The second pin 2215 of the multi-winding inductor and the fourth pin 2225 of the multi-winding inductor are arranged on the second surface 2101 of the magnetic core, for example, on the lower surface 2101 of the multi-winding inductor, and may be directly connected to the load. Such arrangement is provided such that the path between the output of the power module and the load is shortest, and also is beneficial to reduce the impedance and improve efficiency.

Figure 4A:
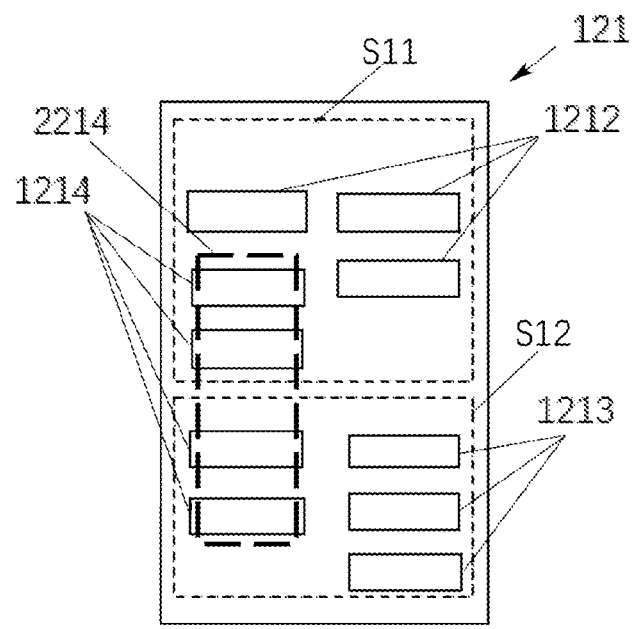
FIG. 4a and FIG. 4b are schematic view showing a pad layout of a first switching unit in the first embodiment.

As shown in FIGS. 3b and 4a, FIG. 4a is a schematic view showing a pad layout of the first switching unit 121 in the first embodiment. The first switching unit 121 and the second switching unit 122 in the integrated power module have rectangular structures. The width direction of the first winding 221 and the second winding 222 is consistent with the length direction of the first switching unit 121 or the second switching unit 122. It can be understood that the first pin 2214 or the third pin 2224 is basically rectangular in shape, and the length direction of the first pin 2214 or the third pin 2224 is consistent with the length direction of the first switching unit 121 or the second switching unit 122. As an example of the first switching unit 121 as shown in FIG. 4a, the first switching unit 121 includes a first switching device S11 and a second switching device S12. The first switching device S11 includes an input pad 1212 (corresponding to the Vin in FIG. 2) and a switch node pad 1214 (corresponding to the node SW1 in FIG. 2). The second switching device S12 includes a switch node pad 1214 (corresponding to the node SW1 in FIG. 2) and a ground pad 1213 (corresponding to the node GND in FIG. 2). In conjunction with FIG. 2, the input pin1 (i.e., the first pin 2214) of the multi-winding inductor is connected with the first switching device S11 and the second switching device S22. Therefore, the shorter the connected path is, the better the connected area is.

As for the pad structure as shown in FIG. 4a, the first switching unit 121 is rectangular, and the length direction of the first switching unit 121 is consistent with the width direction of the first winding 221, and the width direction of the first winding 221 is parallel to the extension direction of the magnetic column. In the case that the width of the winding of the multi-winding inductor is larger than the thickness thereof, between the first pin 2214 of the multi-winding inductor and the switch node pad 1214, the connection path is shortest and the overlapped area is large, and the connection impedance is small, which is beneficial to improve the efficiency. The second switching unit 122 has the same circumstance above.

Figure 4B:
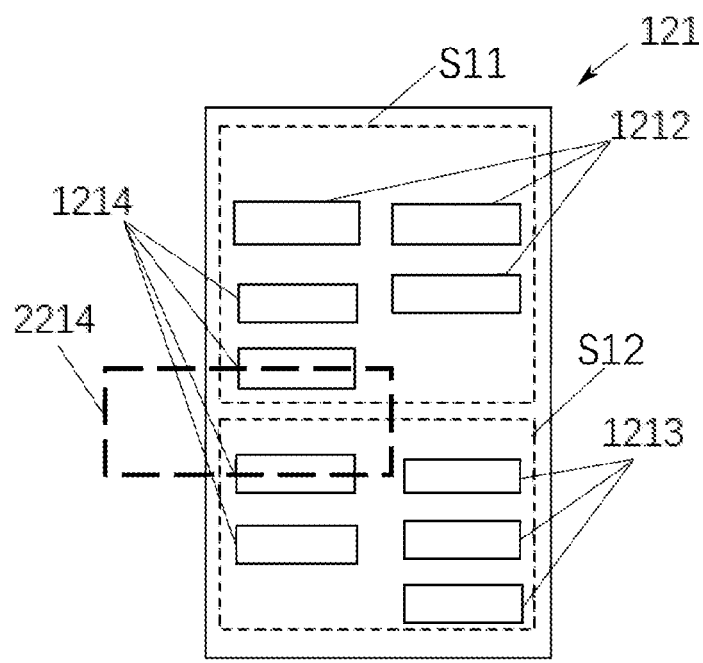

As for the pad structure as shown in FIG. 4b, in the case that the width of the winding of the multi-winding inductor is smaller than the thickness thereof, between the first pin 2214 of the multi-winding inductor and the switch node pad 1214, the overlapped area is small and the connection impedance is large, which is harmful to improve efficiency.

Figure 5A:
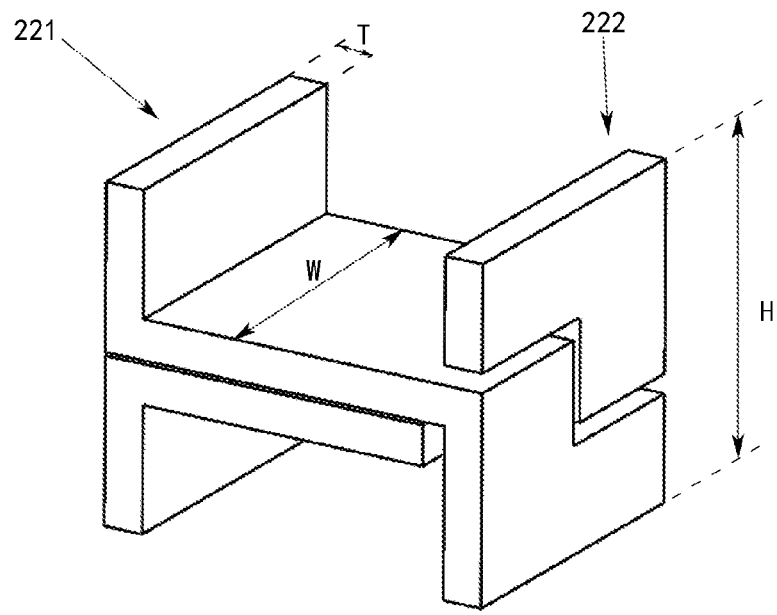
Figure 5B:
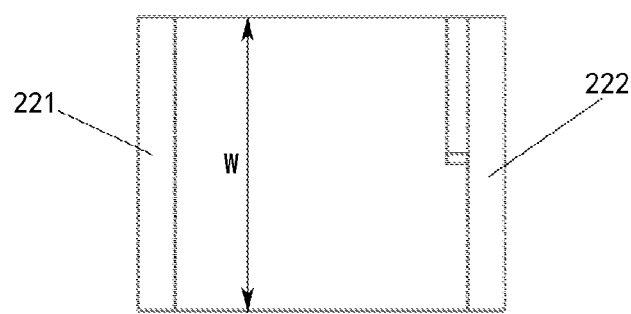
Figure 5C:
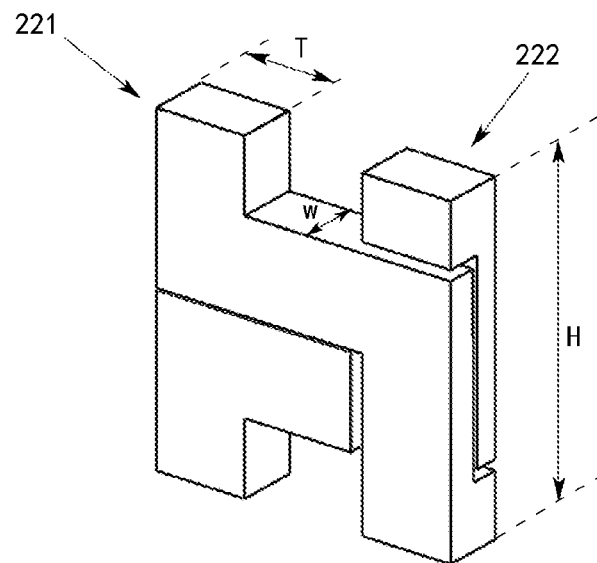
FIG. 5c is a schematic structural view of a winding of the multi-winding inductor in another embodiment.

Referring to FIG. 5a, FIG. 5b and FIG. 5c, FIG. 5a is a schematic structural view of a winding of the multi-winding inductor in FIG. 3a; FIG. 5b is a top view of FIG. 5a; FIG. 5c is a schematic structural view of a winding of the multi-winding inductor in another embodiment. FIGS. 5a and 5c are schematic structural views respectively showing the windings with different width and thickness relationships. In the winding as shown in FIG. 5a, the width W of the winding is greater than the thickness T thereof, at this time, the size of the winding stacked in the height direction H is small, so the height of the entire winding is small, which is beneficial to reduce the height of the multi-winding inductor. In the winding as shown in FIG. 5c, when the width W of the winding is less than the thickness T thereof, the size of the windings stacked in the height direction H is larger, which is harmful to reduce the height of the multi-winding inductor. Therefore, the width W of the winding is greater than the thickness T, on one hand, it is beneficial to reduce the connection loss between the winding and the switching unit, on the other hand, it is also beneficial for reducing the height of the multi-winding inductor.

As shown in FIGS. 5b and 3d, the width W of the first winding 221 and the second winding 222 after being assembled is the same as the width W1 of one of the two windings, for example the first winding 221, so that the length of the magnetic path (i.e., the first magnetic path) in second portions of the two windings is reduced by half, so as to facilitate the improvement of the coupling efficiency.

Figure 6A:
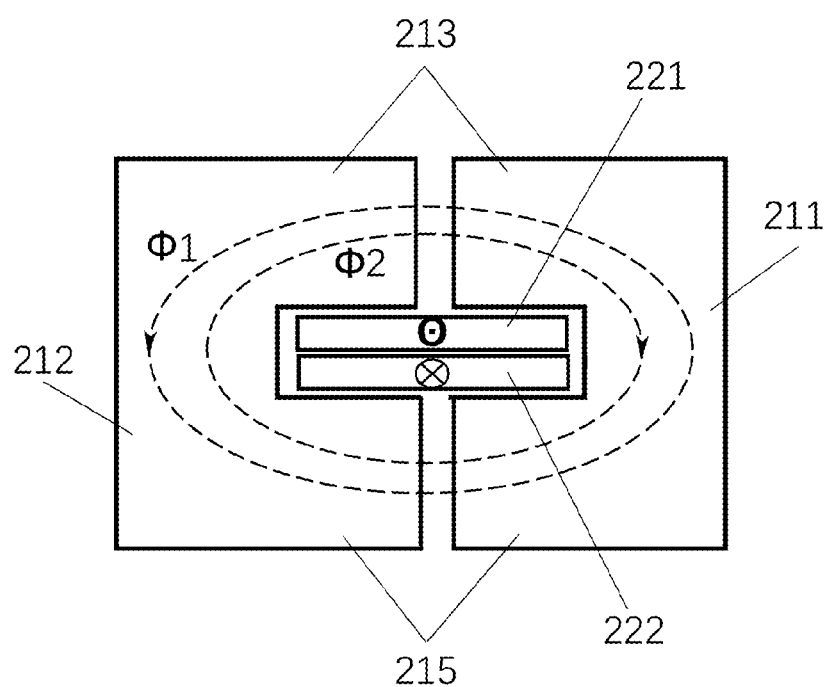
FIG. 6a is a sectional view taken along a line A-A of the multi-winding inductor in FIG. 3b.
Figure 6B:
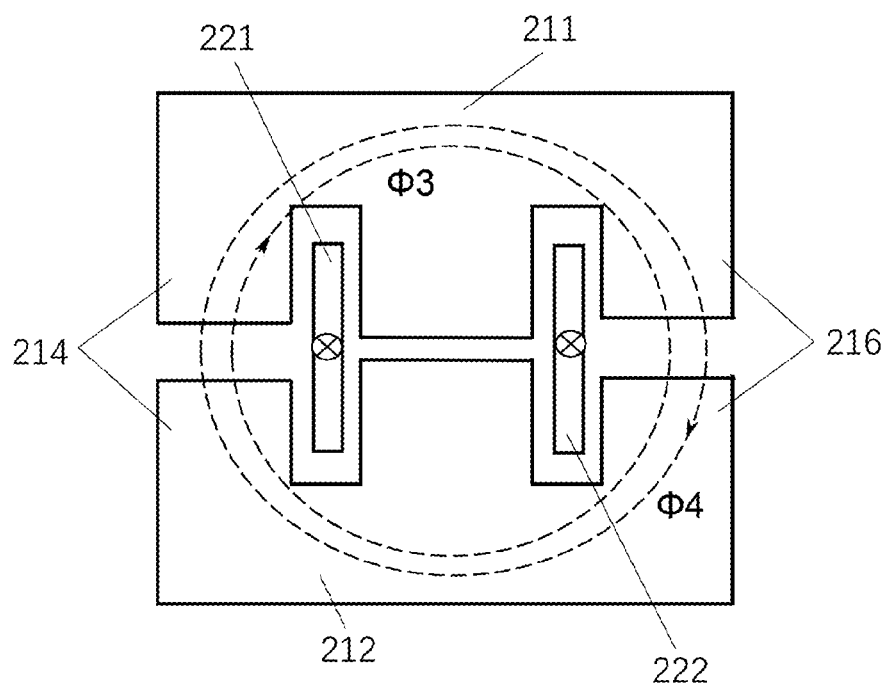
FIG. 6b is a top view of the multi-winding inductor.

Referring to FIG. 6a and FIG. 6b, FIG. 6a is a sectional view of line A-A in the multi-winding inductor in FIG. 3b; and FIG. 6b is a top view of the multi-winding inductor. When a current flows in from the first pin 2214 and the third pin 2224 of the multi-winding inductor and flows out from the second pin 2215 and the fourth pin 2225, and a magnetic flux generated by the first winding 221 and the second winding 222 are shown in dotted lines in FIG. 6a and FIG. 6b.

FIG. 6a shows a first magnetic path formed by the first cover plate 211, the first magnetic column 213, the second cover plate 212 and the third magnetic column 215; wherein Φ1 is a magnetic flux generated by the current in the first winding 221; Φ2 is a magnetic flux generated by the current in the second winding 222; since the magnetic flux Φ1 and the magnetic flux Φ2 have opposite directions, thereby canceling each other and forming a negative coupling.

FIG. 6b shows a second magnetic path formed by the first cover plate 211, the second magnetic column 214, the second cover plate 212 and the fourth magnetic column 216 of the magnetic core; wherein Φ3 is a magnetic flux generated by the current in the first winding 221; Φ4 is a magnetic flux generated by the current in the second winding 222; since the magnetic flux Φ3 and the magnetic flux Φ4 have the same direction, thereby reinforcing each other and forming a positive coupling.

When the magnetic fluxes Φ1, Φ2 are greater than the magnetic fluxes Φ3, Φ4, that is, when a reluctance of the first magnetic path is less than a reluctance of the second magnetic path, the multi-winding inductor generally presents a negative coupling relationship, and the first pin and the third pin of the multi-winding inductor are terminals of different magnetic polarity. When the magnetic fluxes Φ1, Φ2 are less than the magnetic fluxes Φ3, Φ4, that is, when the reluctance of the first magnetic path is greater than the reluctance of the second magnetic path, the multi-winding inductor generally presents a positive coupling relationship, and the first pin and the third pin of the multi-winding inductor are dotted terminals (terminals of same magnetic polarity). When the magnetic fluxes Φ1, Φ2 are equal to the magnetic fluxes Φ3, Φ4, that is, when the reluctance of the first magnetic path is equal to the reluctance of the second magnetic path, the multi-winding inductor generally presents a non-coupling relationship.

Referring to a reluctance formula of the magnetic core: $Rm=le/(\mu e * Ae)$, wherein Rm is a reluctance, le is an equivalent magnetic path length, μe is an equivalent permeability, and Ae is an equivalent magnetic sectional area. As can be determined from the reluctance formula, the reluctance Rm of the magnetic core is proportional to the equivalent magnetic path length le of the magnetic path, and is inversely proportional to the equivalent permeability μe of the magnetic core, and is inversely proportional to the equivalent magnetic sectional area Ae of the magnetic core. According to the reluctance formula, the difference of the reluctance can be achieved by following methods: firstly, the difference of the reluctances of the magnetic paths can be achieved by adjusting the equivalent permeability of the magnetic path by setting and adjusting the length of the air gap; secondly, the difference of the reluctances of the magnetic paths can be achieved by setting the magnetic permeability of the magnetic materials of the magnetic paths without setting the air gap; thirdly, in the case of the same magnetic materials without setting the air gap, the difference of reluctances of the magnetic paths can be achieved by adjusting a ratio le/Ae between the equivalent magnetic path length and the equivalent magnetic sectional area; fourthly, two or three of the first, second and third methods as set forth above are used in combine.

In this embodiment, in order to realize the negative coupling, the first method as set forth above is adopted to adjust the equivalent permeability of magnetic path by setting the air gap, that is, setting the air gap on at least one of the first magnetic column 213 and the third magnetic column 215 of the first magnetic path, and setting the air gap on at least one of the second magnetic column 214 and the fourth magnetic column 216 of the second magnetic path, and thereby the total length of the air gaps in the first magnetic path is less than the total length of the air gaps in the second magnetic path; or merely setting the air gap on at least one of the second magnetic column 214 and the fourth magnetic column 216 of the second magnetic path without setting the air gap in the first magnetic column 213 and the third magnetic column 215 of the first magnetic path, thereby realizing that the reluctance in the first magnetic path is less than the reluctance in the second magnetic path, therefore, the magnetic fluxes Φ1, Φ2 are greater than the magnetic fluxes Φ3, Φ4 so as to achieve the negative coupling.

TABLE 1

| | | | |
|---|---|---|---|
| air gap (mm) in the first magnetic column and the third magnetic column | 0.05 | 0.3 | 0.1 |
| air gap (mm) in the second magnetic column and the fourth magnetic column | 0.3 | 0.05 | 0.1 |
| the relationship between the magnetic fluxes φ1, φ2 and the magnetic fluxes φ3, φ4 | φ1, φ2 > φ3, φ4 | φ1, φ2 < φ3, φ4 | φ1, φ2 = φ3, φ4 |
| self-inductance ls (nh) | 104 | 145 | 54 |
| mutual inductance m (nh) | —50 | 113 | 2.2 |
| coupling situation | negative coupling | positive coupling | non-coupling |

That as shown in table 1 is an arrangement in the first embodiment, in which the air gap of the first magnetic column and the third magnetic column is different from the air gap of the second magnetic column and the fourth magnetic column in length, thereby obtaining the coupling relationship of the negative coupling, the positive coupling and the non-coupling, respectively. As shown in table 1, when the air gap of the first magnetic column and the third magnetic column is smaller than the air gap of the second magnetic column and the fourth magnetic column, the magnetic fluxes Φ1, Φ2 are larger than the magnetic fluxes Φ3, Φ4, so as to achieve the negative coupling relationship; when the air gap of the first magnetic column and the third magnetic column is greater than the air gap of the second magnetic column and the fourth magnetic column, the magnetic fluxes Φ1, Φ2 are less than the magnetic fluxes Φ3, Φ4, so as to achieve the positive coupling relationship; when the air gap of the first magnetic column and the third magnetic column is equal to the air gap of the second magnetic column and the fourth magnetic column, the magnetic fluxes Φ1, Φ2 are equal to the magnetic fluxes Φ3, Φ4, so as to achieve the non-coupling relationship. In other embodiments, the materials with various magnetic permeability are used such that, the reluctance in the path of the magnetic fluxes Φ1, Φ2 is less than the reluctance in the path of the magnetic fluxes Φ3, Φ4, so as to achieve an object of negative coupling.

Further, in the first embodiment, a plurality of conductive elements is arranged around the magnetic core 21. The conductive element includes a first end and a second end, the first end forms a fifth pin on the first surface, for example the upper surface of the magnetic core; and the second end forms a sixth pin on the second surface, for example the lower surface of the magnetic core. A plurality of conductive elements includes, for example, a signal connection assembly and at least two groups of power connection assemblies. At least two groups of power connection assemblies are respectively arranged on the first side and the second side of the multi-winding inductor, and the first side and the second side are arranged oppositely; and the signal connection assembly is arranged on the third and/or fourth sides of the multi-winding inductor, wherein the third side and the fourth side are arranged oppositely and are connected between the first side and the second side.

For example, as shown in FIGS. 3b and 3c, at least two groups of the power connection assemblies include a first power connection assembly on the first side of the magnetic core and a second power connection assembly on the second side of the magnetic core. The first power connection assembly includes a first input conductive element 231 and a first ground conductive element 232; and the second power connection assembly includes a second input conductive element 233 and a second ground conductive element 234. The first input conductive element 231 and the first ground conductive element 232 are arranged on the outer side of the second magnetic column 214, and the second input conductive element 233 and the second ground conductive element 234 are arranged on the outer side of the fourth magnetic column 216. The signal connection assembly includes a plurality of signal conductive elements 241 that are arranged on the third side of the magnetic core, for example the outer side of the second cover plate 212.

As shown in the circuit topology principle view of FIG. 2, input connecting wires 104 and 105 in FIG. 2 correspond to input conductive elements 231 and 233 in FIG. 3c, respectively; and ground connecting wires 106 and 107 in FIG. 2 correspond to ground conductive elements 232 and 234 in FIG. 3c, respectively. In the circuit topology principle view as shown in FIG. 2, the input connecting wire 104 and the ground connecting wire 106 form a loop through the first switching unit 101 and the input power supply. The existence of the loop can produce a loop parasitic inductance, if the loop parasitic inductance resonates with an input capacitor, the efficiency of the power supply system can be affected. In order to reduce the loop parasitic inductance, the first input conductive element 231 and the first ground conductive element 232 are arranged side by side in the first embodiment, to minimize a distance between the first input conductive element 231 and the first ground conductive element 232 as possible, the smaller the distance, the smaller the area of the loop, the less the parasitic inductance in the loop, thereby being beneficial to the improvement of the efficiency. Similarly, the second input conductive element 233 and the second ground conductive element 234 are arranged side by side, to minimize the distance between them as possible. The conductive elements all form pads on the first surface and the second surface of the magnetic core 21, that is, the fifth pin and the sixth pin as mentioned above, for power connection or signal transmission between the integrated power module 1 and the load. In other embodiments, the conductive elements may be arranged in a different way.

In the first embodiment, the first and third pins of the multi-winding inductor are arranged on the first surface of the multi-winding inductor, and the second and fourth pins of the multi-winding inductor are arranged on the second surface of the multi-winding inductor, so that the four sides of the multi-winding inductor all may be used to set the power connection assembly and the signal connection assembly. In the multi-winding inductor of this disclosure, the arrangement of the magnetic core and the winding provide sufficient space for the setting of the input connection assembly and the signal connection assembly of the power supply module.

The Second Embodiment

Figure 7A:
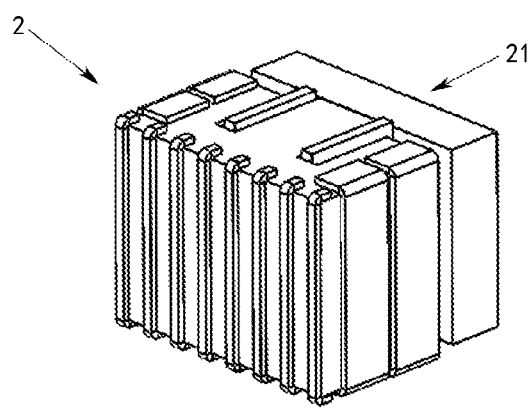
FIG. 7a is an assembling view of the power supply module according to the second embodiment of this disclosure, in which an integrated power module is omitted.
Figure 7B:
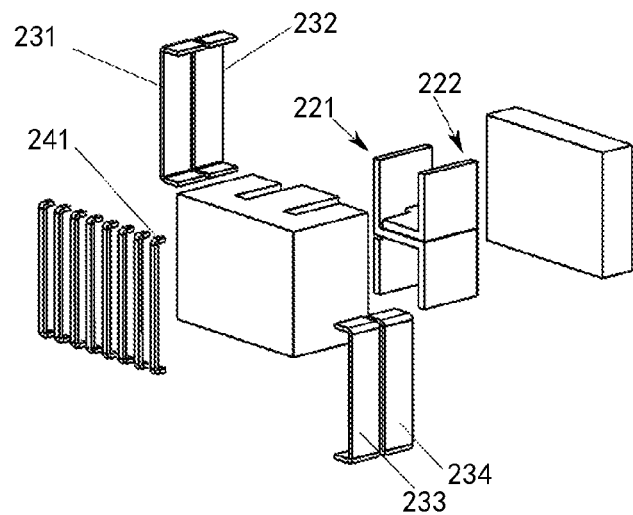
Figure 7C:
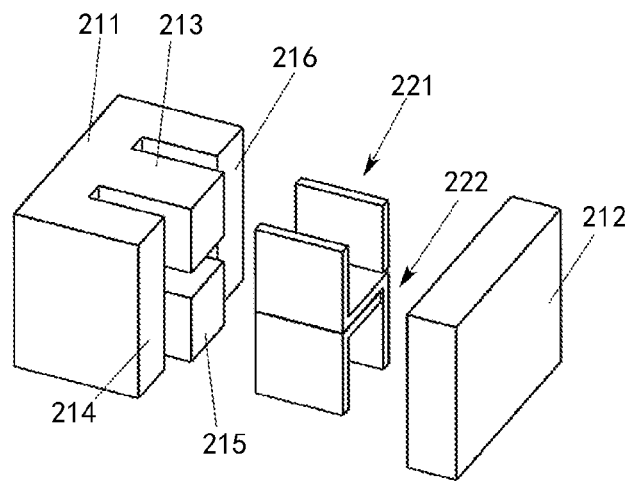

Referring to FIG. 7a to FIG. 7c, FIG. 7a is an assembling view of the power supply module according to the second embodiment of this disclosure, in which an integrated power module is omitted; and FIG. 7b is an exploded view of FIG. 7a; FIG. 7c is an exploded view of the multi-winding inductor in FIG. 7a. The difference of the power supply module of the second embodiment in comparison with that of the first embodiment is that the specific structure of the multi-winding inductor 2 is slightly different.

As shown in FIG. 7c, a multi-winding inductor in the second embodiment of the power supply module includes a magnetic core 21 and a winding. The magnetic core 21 includes a first cover plate 211 and a second cover plate 212 arranged oppositely, and a first magnetic column 213, a second magnetic column 214, a third magnetic column 215 and a fourth magnetic column 216 arranged between the first cover plate 211 and the second cover plate 212. In the second embodiment, the second cover plate 212 and the magnetic columns are separated by the air gap to form an I-type magnetic core portion. The first cover plate 211 is connected with the first magnetic column 213, the second magnetic column 214, the third magnetic column 215 and the fourth magnetic column 216, to form a magnetic core portion with double-central column E type structure. Therefore, the magnetic core structure in the second embodiment is double-central column EI type magnetic core.

The winding in the second embodiment includes the first winding 221 and the second winding 222, which is basically the same with the winding structure as illustrated in FIG. 3d in the first embodiment. The width of the winding is greater than the thickness thereof, a welding area of the first pin of the winding and the pad of the switching unit is large, and the connection impedance is minimized. The first pin 2214 of the multi-winding inductor and the third pin 2224 of the multi-winding inductor are arranged on the first surface of the multi-winding inductor, and are directly connected with the switch node pad of the first switching unit 121 and the switch node pad of the second switching unit 122, as such, the path between the switching unit and the multi-winding inductor is shortest, thereby reducing the impedance and improving the efficiency. The second pin 2215 of the multi-winding inductor and the fourth pin 2225 of the multi-winding inductor are arranged on the second surface of the multi-winding inductor, and are directly connected with the load, as such, the path between the output of the VRM and the load is shortest, thereby reducing the impedance and improving the efficiency.

The position relationship between the windings and the first magnetic column 213, the second magnetic column 214, the third magnetic column 215 and the fourth magnetic column 216 in the second embodiment is basically the same as that in the first embodiment. When the current flows in from the first pin and the third pin of the multi-winding inductor, and flows out from the second pin and the fourth pin of the multi-winding inductor, the current in the two windings respectively form magnetic fluxes $\Phi 1$, $\Phi 2$ in the first magnetic path; the current in the two windings respectively form the magnetic fluxes $\Phi 3$, $04$ in the second magnetic path; the direction of the magnetic flux $\Phi 1$ is opposite to the of the magnetic flux $\Phi 2$; the directions of the magnetic fluxes $\Phi 3$ and $\Phi 4$ are the same. When the magnetic fluxes $\Phi 1$, $\Phi 2$ are greater than the magnetic fluxes $\Phi 3$, $\Phi 4$, the multi-winding inductor generally realizes the negative coupling relationship, and the first pin and the third pin of the multi-winding inductor are terminals of different magnetic polarity; when the magnetic fluxes $\Phi 1$, $\Phi 2$ are less than the magnetic fluxes $\Phi 3$, $\Phi 4$, the multi-winding inductors generally realize the positive coupling relationship, and the first pin and the third pin of the multi-winding inductor are the dotted terminals (terminals of same magnetic polarity); when the magnetic fluxes $\Phi 1$, $\Phi 2$ are equal to the magnetic fluxes $\Phi 3$, $\Phi 4$, the multi-winding inductor generally realizes the non-coupling relationship. In the second embodiment, the air gap in the first magnetic column 213 and the third magnetic column 215 is smaller than the air gap in the second magnetic column 214 and the fourth magnetic column 216 such that the reluctance in the path of the magnetic fluxes $\Phi 1$, $\Phi 2$ is less than the reluctance in the path of the magnetic fluxes $\Phi 3$, $\Phi 4$. Therefore, the magnetic fluxes $\Phi 1$, $\Phi 2$ are greater than the magnetic fluxes $\Phi 3$, $\Phi 4$, so as to achieve the negative coupling.

As shown in FIG. 7b, the conductive elements 231, 232, 233 and 234 in the second embodiment are respectively arranged on a side column of the double-central column E type magnetic core, that is, on the outer side of the second magnetic column 214 and the fourth magnetic column 216. The first input conductive element 231 and the first ground conductive element 232 are arranged symmetrical to the second input conductive element 233 and the second ground conductive element 234 on the opposite sides of the multi-winding inductor. The signal conductive element 241 is arranged on the outer side of the first cover plate 211, that is, on the outer side of the cover plate of the double-central column E type magnetic core. The conductive elements each form a pad on the first and second surfaces of the magnetic core, for the power connection or the signal transmission between the integrated power supply module 1 and the load.

In the second embodiment, the magnetic core is arranged in a structural form of the double-central column E type magnetic core and the I type cover plate, the position of the air gap moves from the central position of the magnetic core in the first embodiment to one side, because the conductive elements when setting need to avoid the air gap, relative to the four conductive elements in the first embodiment, and only two conductive elements 232, 234 in the second embodiment need to avoid the air gap, flux leakage of the air gap and eddy current loss of an edge flux on the conductive elements are reduced.

Other structures, for example the integrated power module and the conductive elements, of the power supply module of the second embodiment are basically the same as those of the first embodiment and will not be described here.

The Third Embodiment

Figure 8A:
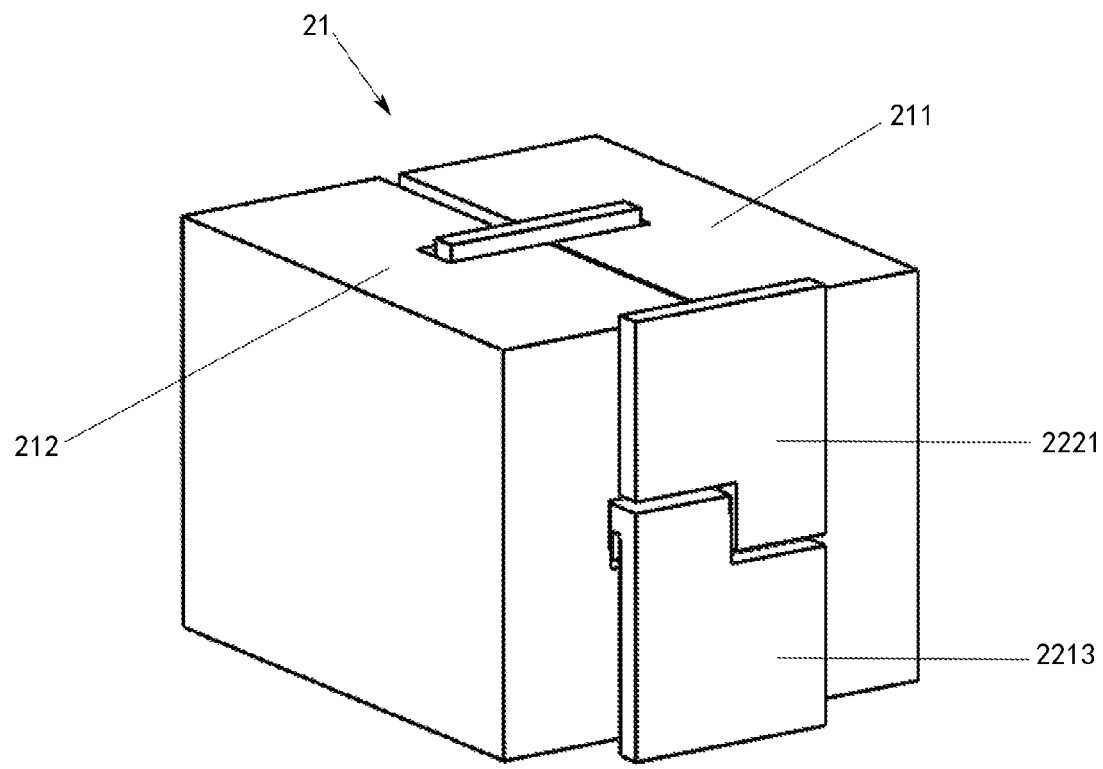
FIG. 8a is a schematic view of a multi-winding inductor of the power supply module according to the third embodiment of this disclosure.
Figure 8B:
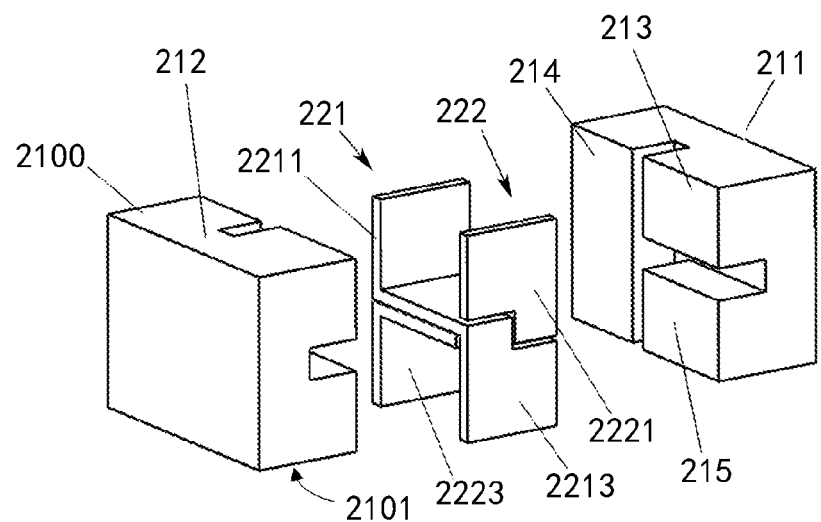
FIG. 8b is an exploded view of the multi-winding inductor of the power supply module according to the third embodiment of this disclosure.

FIG. 8a is a schematic view of a multi-winding inductor of the power supply module according to the third embodiment of this disclosure. FIG. 8b is an exploded view of the multi-winding inductor according to the third embodiment of this disclosure. As shown in FIG. 8a and FIG. 8b, the multi-winding inductor includes a magnetic core and a winding. The magnetic core has only three magnetic columns and two cover plates. The structure of the magnetic core is similar to the magnetic core formed by cutting off the fourth magnetic column 216 and part of the cover plates as shown in FIG. 3c.

In detail, as shown in FIG. 8b, the magnetic core includes the first cover plate 211 and the second cover plate 212 arranged oppositely, and the first magnetic column 213, the second magnetic column 214 and the third magnetic column 215 orderly arranged counterclockwise between the first cover plate 211 and the second cover plate 212.

The winding assembly of the multi-winding inductor includes a first winding 221 and a second winding 222 arranged crosswise, which is the same as that in the first embodiment, and is beneficial to reduce a volume of the multi-winding inductor. The first winding 221 and the second winding 222 each includes a first portion, a second portion and a third portion, wherein the first portion and the third portion of each of the windings are connected by the second portion. The first winding is provided with a notch or a hole, the second winding is provided with a notch or a hole, the first winding and the second winding are arranged crosswise through the notch or the hole, so that the second portion 2212 of the first winding 221 and the second portion 2222 of the second winding 222 are overlapped.

The first magnetic column 213 is arranged between the first portion 2211 of the first winding 221 and the first portion 2221 of the second winding 222. The second magnetic column 214 is arranged on one side of the first portion 2211 of the first winding 221 and the third portion 2223 of the second winding 222. The third magnetic column 215 is arranged between the third portion 2213 of the first winding 221 and the third portion 2223 of the second winding 222.

The first portion 2211 of the first winding 221 extends to the first surface 2100 of the magnetic core so as to form the first pin 2214 of the inductor; the third portion 2213 of the first winding 221 extends to the second surface 2101 of the magnetic core so as to form the second pin 2215 of the inductor; and the first portion 2221 of the second winding 222 extends to the first surface 2100 of the magnetic core so as to form the third pin 2224 of the inductor; and the third portion 2223 of the second winding 222 extends to the second surface 2101 of the magnetic core so as to form the fourth pin 2225 of the inductor. The first surface 2100 and the second surface 2101 of the magnetic core are arranged oppositely.

The current in the first winding 221 flows in from the first pin 2214 of the first surface, and the current in the second winding 222 flows in from the third pin 2224 of the first surface. When the magnetic flux in the path formed by the first cover plate 211, the first magnetic column 213, the second cover plate 212 and the third magnetic column 215 is greater than the magnetic flux in the path formed by the first cover plate 211, the first magnetic column 213, the second cover plate 212 and the second magnetic column 214, or is greater than the magnetic flux in the path formed by the first cover plate 211, the third magnetic column 215, the second cover plate 212 and the second magnetic column 214, the multi-winding inductor realizes the negative coupling relationship, and the first pin 2214 and the third pin 2224 of the multi-winding inductor are terminals of different magnetic polarity to each other. The multi-winding inductor in the third embodiment has only three magnetic columns, so that the equivalent magnetic path sectional area of each of the magnetic columns is larger and the loss of the magnetic core is reduced, at the same time, the magnetic core has a simple structure and is easy to manufacture.

Other structures, for example the integrated power module and the conductive elements, of the power supply module in the third embodiment are basically the same as those in the first embodiment and will not be described here.

The Fourth Embodiment

Figure 9A:
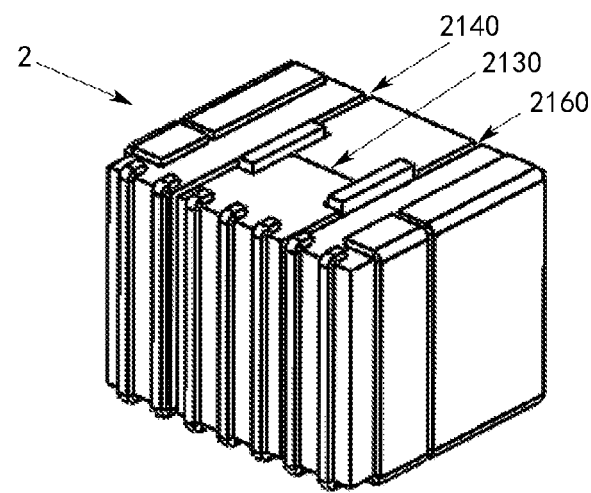
FIG. 9a is an assembling view of the power supply module according to the fourth embodiment of this disclosure, in which an integrated power module is omitted.
Figure 9B:
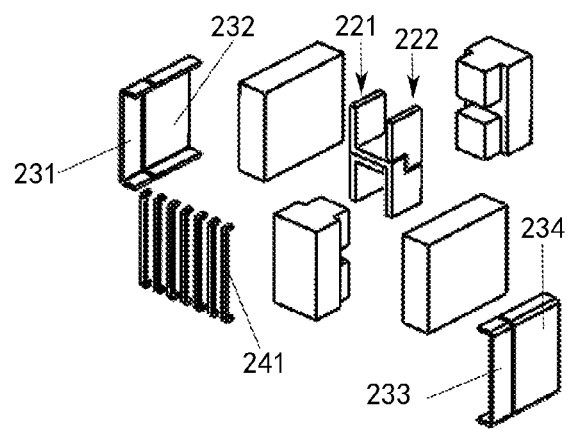
Figure 9C:
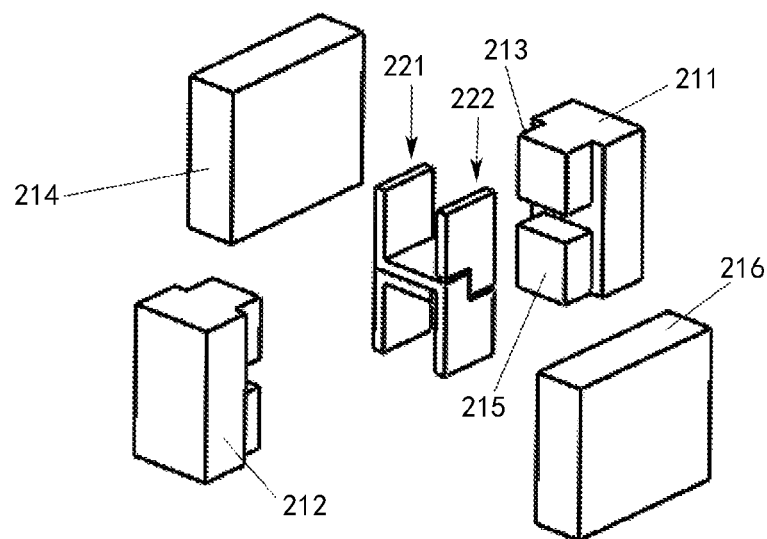

Referring to FIG. 9a to FIG. 9c, FIG. 9a is an assembling view of the power supply module according to the fourth embodiment of this disclosure, in which an integrated power module is omitted; FIG. 9b is an exploded view of FIG. 9a; FIG. 9c is an exploded view of the multi-winding inductor in FIG. 9a. As shown in FIGS. 9a and 9b, the difference between the power supply modules of the fourth embodiment in comparison with that of the first embodiment lies in the specific structure of the multi-winding inductor 2.

As shown in FIG. 9c, a magnetic core of a multi-winding inductor in the fourth embodiment includes a first cover plate 211, a second cover plate 212, a first magnetic column 213, a second magnetic column 214, a third magnetic column 215 and a fourth magnetic column 216. The first cover plate 211, the second cover plate 212, the first magnetic column 213, the second magnetic column 214, the third magnetic column 215, and the fourth magnetic column 216 are assembled together. The second magnetic column 214 and the fourth magnetic column 216 are separated by the first air gap 2140 and the second air gap 2160, respectively, to form two I type magnetic core structures. Each of the first magnetic column 213 and the third magnetic column 215 is divided into two symmetrical portions by the third air gap 2130. The first portions of the first magnetic column 213 and the third magnetic column 215 are connected with the first cover plate 211 to form a U-shaped magnetic core structure, and the second portions of the first magnetic column 213 and the third magnetic column 215 are connected with the second cover plate 212 to form a U-shaped magnetic core structure. The first cover plate 211, the second cover plate 212, the first magnetic column 213 and the third magnetic column 215 are divided into two symmetrical U-shaped magnetic core structures by the third air gap 2130. Therefore, the magnetic core in the fourth embodiment is IUUI type magnetic core.

The first winding 221 and the second winding 222 in the fourth embodiment have a winding structure that is basically the same as that shown in FIG. 3d in the first embodiment. The width of the winding is greater than the thickness thereof, and a welding area of the pad of the winding (i.e., the pin of the multi-winding inductor) and the switch node pad of the switching unit is large, and the connection impedance is minimized. The first pin 2214 of the multi-winding inductor and the third pin 2224 of the multi-winding inductor are arranged on the first surface of the multi-winding inductor, and are directly connected with the pad of the first switching unit 121 and the pad of the second switching unit 122, as such, the connection path between the switching unit and the windings of the multi-winding inductor is short, to facilitate reducing the impedance and improving the efficiency. The second pin 2215 of the multi-winding inductor and the fourth pin 2225 of the multi-winding inductor are arranged on the second surface of the multi-winding inductor, and are directly connected with the load, as such, the path between the output of the power supply system and the load is short, to facilitate reducing the impedance and improving the efficiency.

The position relationship between the windings and the first magnetic column 213, the second magnetic column 214, the third magnetic column 215, and the fourth magnetic column 216 in the fourth embodiment is basically the same as that in the first embodiment. When the current flows in from the first pin and the third pin of the multi-winding inductor and flows out from the second pin and the fourth pin thereof, the current in the two windings respectively form magnetic fluxes $\Phi 1$, $02$ in the first magnetic path (i.e., the magnetic flux path formed by the first cover plate 211, the first magnetic column 213, the second cover plate 212 and the third magnetic column 215); and the current in the two windings respectively form magnetic fluxes $\Phi 3$, $04$ in the second magnetic path (i.e., the magnetic flux path formed by the first cover plate 211, the second magnetic column 214, the second cover plate 212 and the fourth magnetic column 216). The magnetic fluxes $\Phi 1$ and $02$ have the same size and opposite directions; and the magnetic fluxes Φ3 and 04 have the same size and the same direction. When the magnetic fluxes Φ1, Φ2 are greater than the magnetic fluxes Φ3, Φ4, the multi-winding inductor realizes the negative coupling relationship, and the first pin and the third pin of the multi-winding inductor are terminals of different magnetic polarity to each other; when the magnetic fluxes Φ1, Φ2 are less than the magnetic fluxes Φ3, Φ4, the multi-winding inductor realizes the positive coupling relationship, and the first pin and the third pin of the multi-winding inductor are dotted terminals (terminals of same magnetic polarity) to each other; and when the magnetic fluxes Φ1, Φ2 are equal to the magnetic fluxes Φ3, Φ4, the multi-winding inductor realizes the non-coupling relationship. In the fourth embodiment, in order to achieve the negative coupling, the air gap in the first magnetic column 213 and the third magnetic column 215 is smaller than the air gap in the second magnetic column 214 and the fourth magnetic column 216, such that the reluctance in the path of the magnetic fluxes Φ1, Φ2 is less than the reluctance in the path of the magnetic fluxes Φ3, Φ4. Therefore, the magnetic fluxes Φ1, Φ2 are greater than the magnetic fluxes Φ3, Φ4, so as to achieve the negative coupling.

In addition, in other embodiments, in the IUUI magnetic core structure as shown in FIG. 9c, a UU structure magnetic core composed of the first cover plate 211, the second cover plate 212, the first magnetic column 213 and the third magnetic column 215 is set as the magnetic material with high magnetic permeability, for example a ferrite. An II type magnetic core structure formed by the second magnetic column 214 and the fourth magnetic column 216 is set as the magnetic material with low magnetic permeability, for example a powder core material with an insulation coating. When magnetic path of the magnetic fluxes Φ1, Φ2 and the magnetic path of the magnetic fluxes Φ3, 04 have the same ratio of the equivalent magnetic path length and the equivalent magnetic path sectional area, the magnetic material of the UU type magnetic core has the high magnetic permeability and the low reluctance, and the magnetic fluxes Φ1, Φ2 therein are large; the magnetic materials of the two I type magnetic cores have low magnetic permeability and the high reluctance, and the magnetic fluxes Φ3, Φ4 therein are small. It is possible to realize the requirement that the magnetic fluxes Φ1, Φ2 are greater than the magnetic fluxes Φ3, Φ4. The UU type magnetic core uses the magnetic material with the high magnetic permeability, which can make the coupling of negative coupling multi-winding inductor better. The two I type magnetic cores use the magnetic material with the low magnetic permeability, which can improve a saturation current capability of the negative coupling multi-winding inductor.

As shown in FIG. 9b, the conductive elements 231, 232, 233 and 234 in the fourth embodiment are arranged on the outer sides of the second magnetic column 214 and the fourth magnetic column 216, respectively. The first input conductive element 231 and the first ground conductive element 232 are arranged symmetrical to the second input conductive element 233 and the second ground conductive element 234 on the two opposite sides of the multi-winding inductor. The signal conductive element 241 is arranged on the side of the second cover plate 212. The input conductive element, the ground conductive element and the signal conductive element each may form pads on the first and second surfaces, for the power connection or the signal transmission between the integrated power supply module and the inductor and between the load and the inductor. In this embodiment, the magnetic core is set in the form of IUUI structure, the conductive elements can completely avoid the air gap and reduce the loss of the magnetic flux at the edge of the air gap on the conductive element, and the width of the conductive element can be wider to reduce the DC impedance of the conductive element, and the IUUI type magnetic core structure is also easier to be molded.

The Fifth Embodiment

Figure 10A:
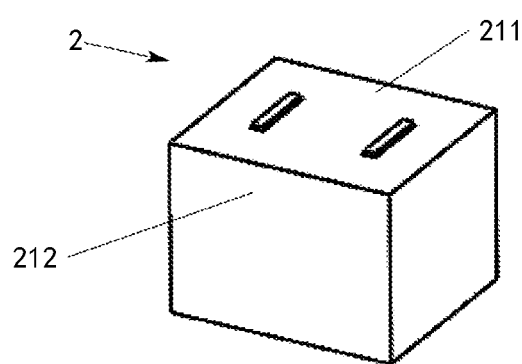
FIG. 10a is a schematic structural view of a multi-winding inductor of the power supply module according to the fifth embodiment of this disclosure.
Figure 10B:
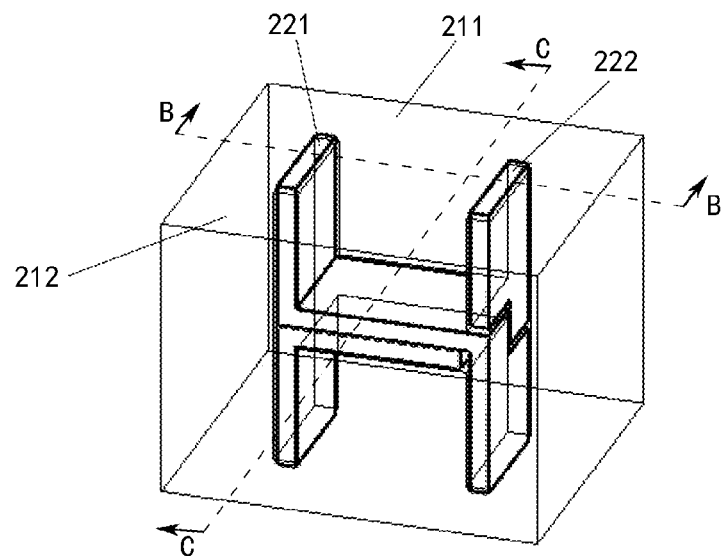
Figure 10C:
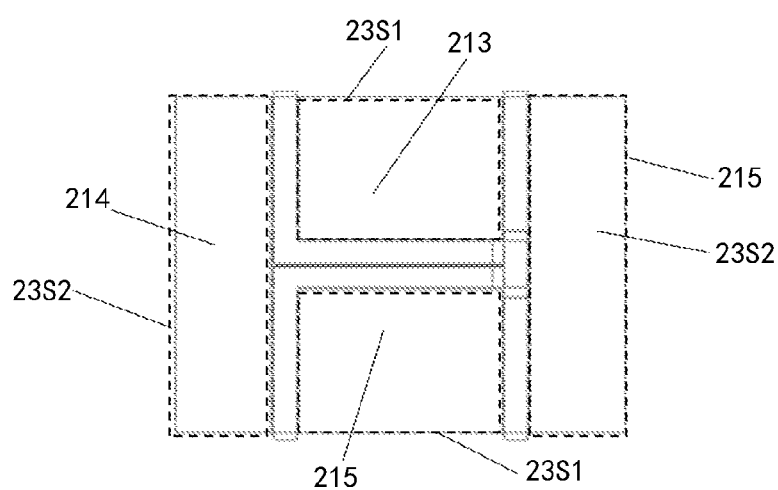
FIG. 10c is a sectional view taken along a line B-B in FIG. 10b.
Figure 10D:
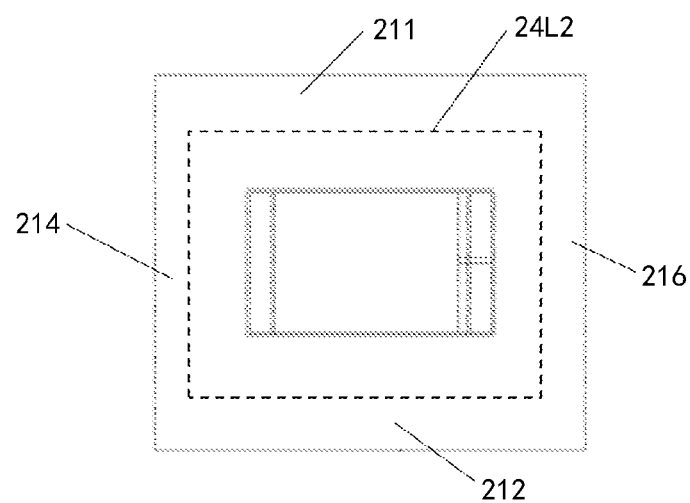
FIG. 10d is a top view of FIG. 10b.
Figure 10E:
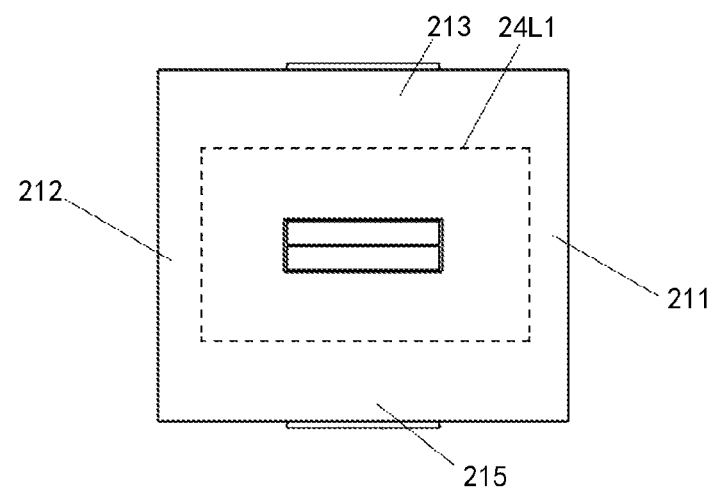
FIG. 10e is a sectional view taken along a line C-C in FIG. 10b.

FIG. 10a is a schematic structural view of another multi-winding inductor according to the fifth embodiment of this disclosure. FIG. 10b is a perspective view of the multi-winding inductor in FIG. 10a. FIG. 10c is a sectional view taken along the line B-B in FIG. 10b. FIG. 10d is a top view of FIG. 10b. FIG. 10e is a sectional view taken along the line C-C in FIG. 10b. As shown in FIG. 10a to FIG. 10e, according to another multi-winding inductor in the fifth embodiment, the magnetic core thereof is a magnetic material with low magnetic permeability with an insulation coating, for example, the magnetic powder material, etc. The inductor is formed by pressing the winding and the magnetic material together and there is no air gap provided in the magnetic core. The multi-winding inductor realizes the negative coupling by setting the equivalent sectional area and the equivalent magnetic path length of the magnetic columns.

As shown in FIG. 10a to FIG. 10e, the magnetic core is an overall structure integrally formed. The magnetic core is separated to form the first cover plate 211, the second cover plate 212, the first magnetic column 213, the second magnetic column 214, the third magnetic column 215, and the fourth magnetic column 216 by the winding. When the current flows in from the first pin and the third pin of the multi-winding inductor and flows out from the second pin and the fourth pin thereof, the current in the two windings respectively form the magnetic fluxes Φ1, Φ2 in the first magnetic path (i.e., the magnetic flux path formed by the first cover plate 211, the first magnetic column 213, the second cover plate 212 and the third magnetic column 215); and the current in the two windings form magnetic fluxes Φ3, Φ4 in the second magnetic path (i.e., the magnetic flux path formed by the first cover plate 211, the second magnetic column 214, the second cover plate 212 and the fourth magnetic column 216). The first magnetic path has an equivalent magnetic path sectional area 23S1 and an equivalent magnetic path length 24L1. The second magnetic path has an equivalent magnetic path sectional area 23S2 and an equivalent magnetic path length 24L2. In the multi-winding inductor, by setting a ratio 24L1/23S1 of the equivalent magnetic path length to the equivalent magnetic path section area of the magnetic flux in the first magnetic path is less than a ratio 24L2/23S2 of the equivalent magnetic path length to the equivalent magnetic path section area of the magnetic flux in the second magnetic path, the magnetic fluxes Φ1, Φ2 are greater than the magnetic fluxes Φ3, Φ4 to achieve the negative coupling.

In structure, by setting the lengths of the second portions of the two windings different, the difference between the magnetic path length and the equivalent magnetic path sectional area can be achieved. For example, when the lengths of the second portions of the two windings become longer, the area of 23S1 becomes larger, the area of 23S2 becomes smaller, the magnetic path length 24L1 remains unchanged, and 24L2 becomes larger. Therefore, the ratio 24L1/23S1 of the equivalent magnetic path length to the equivalent magnetic path section area of the magnetic flux in the first magnetic path is less than the ratio 24L2/23S2 of the equivalent magnetic path length to the equivalent magnetic path sectional area of the magnetic flux in the second magnetic path to achieve the negative coupling.

The Sixth Embodiment

Figure 11A:
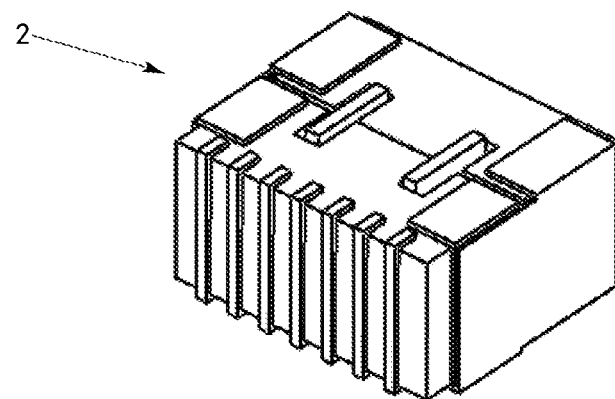
FIG. 11a is an assembling view of the power supply module according to the sixth embodiment of this disclosure, in which an integrated power module is omitted.
Figure 11B:
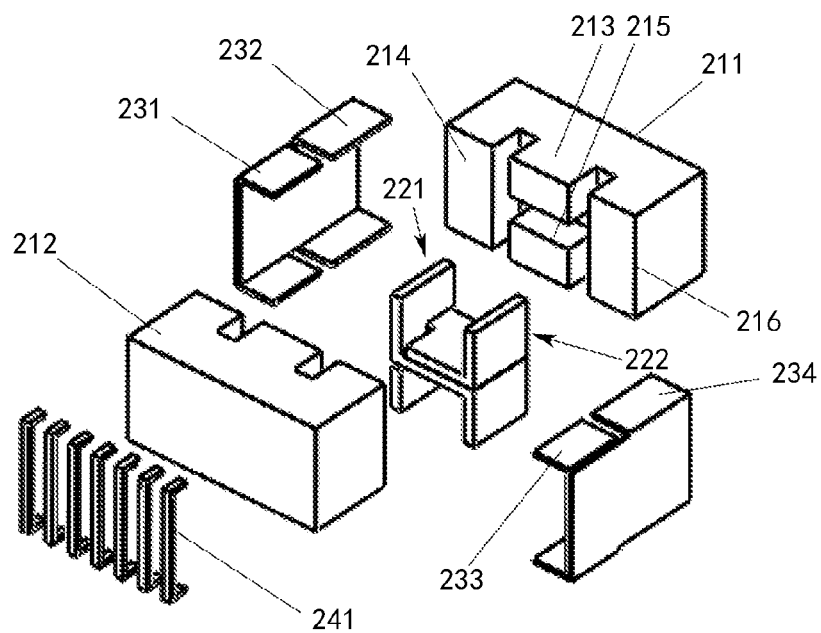
Figure 11C:
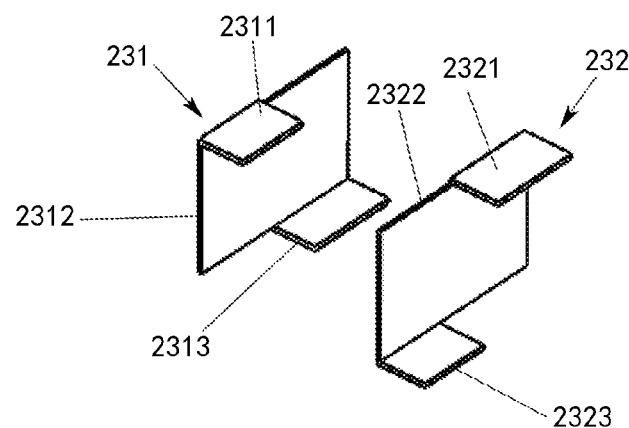
Figure 11D:
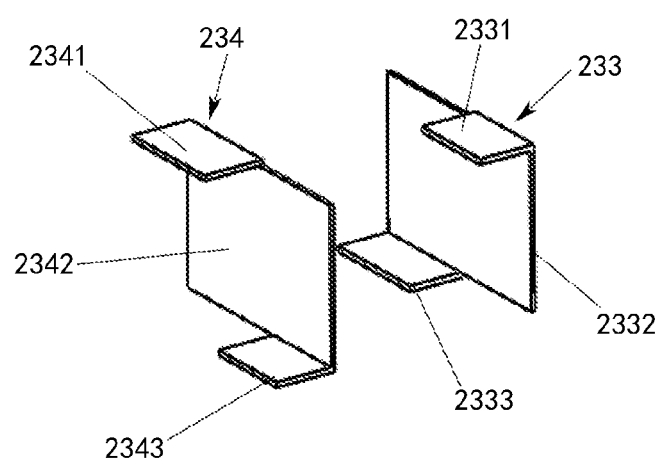

Referring to FIG. 11a to FIG. 11d, FIG. 11a is an assembling view of the power supply module according to the sixth embodiment of this disclosure, in which an integrated power module is omitted. FIG. 11b is an exploded view of FIG. 11a. FIG. 11c is an exploded view of the first power connection assembly in the power supply module in FIG. 11a. FIG. 11d is an exploded view of the second power connection assembly in the power supply module in FIG. 11a. As shown in FIG. 11a and FIG. 11b, the difference of the power supply module of the sixth embodiment in comparison with that of the first embodiment lies in the specific structure of the conductive element.

A plurality of conductive elements of the power supply module includes at least two groups of power connection assemblies. FIG. 11a shows two groups: the first power connection assembly and the second power connection assembly provided on opposite sides of the magnetic core. The first power connection assembly includes a first input conductive element 231 and a first ground conductive element 232; and the second power connection assembly includes a second input conductive element 233 and a second ground conductive element 234.

As shown in FIGS. 11b and 11c, in the sixth embodiment, the first input conductive element 231 overlaps at least partially with the first ground conductive element 232, and the second input conductive element 233 overlaps at least partially with the second ground conductive element 234.

Specifically, the first input conductive element 231 includes a first portion 2311, a second portion 2312, and a third portion 2313 which are connected in sequence. The first ground conductive element 232 includes a first portion 2321, a second portion 2322 and a third portion 2323 which are connected in sequence. The first portion 2311 of the first input conductive element 231 is arranged on a left side of an upper end of the second portion 2312 of the first input conductive element 231. The first portion 2321 of the first ground conductive element 232 is arranged on a right side of an upper end of the second portion 2322 of the first ground conductive element 232. The first portion 2311 of the first input conductive element 231 and the first portion 2321 of the first ground conductive element 232 respectively form pins on the first surface of the magnetic core, for connecting the integrated power module. The third portion 2313 of the first input conductive element 231 is arranged on a right side of a lower end of the second portion 2312 of the first input conductive element 231. The third portion 2323 of the first ground conductive element 232 is arranged on a left side of a lower end of the second portion 2322 of the first ground conductive element 232. The third portion 2313 of the first input conductive element 231 and the third portion 2323 of the first ground conductive element 232 form pins on the second surface of the magnetic core respectively, for connecting a customer's mainboard. The second portion 2312 of the first input conductive element 231 overlaps with the second portion 2322 of the first ground conductive element 232, and the two portions are insulated and have a short interval, so that a loop area between the input conductive elements in this section is small, and the parasitic inductance is small. The first portion 2311 of the first input conductive element 231 is staggered and non-overlapping with the first portion 2321 of the first ground conductive element 232 on the first surface of the magnetic core, the third portion 2313 of the first input conductive element 231 is staggered and non-overlapping with the third portion 2323 of the first ground conductive element 232, such that the magnetic flux in the loop formed by the first portions 2311, 2321 on the first surface and the magnetic flux in the loop formed by the third portions 2313, 2323 on the second surface offset each other, thereby further reducing the parasitic inductance of the whole loop.

As shown in FIG. 11d, the second power connection assembly includes a second input conductive element 233 and a second ground conductive element 234. The structure of the second input conductive element 233 and the second ground conductive element 234 is basically the same as that of the conductive elements 231, 232 as shown in FIG. 11c. Specifically, the second input conductive element 233 includes a first portion 2331, a second portion 2332 and a third portion 2333 which are connected in sequence. The second ground conductive element 234 includes a first portion 2341, a second portion 2342 and a third portion 2343 which are connected in sequence. The second portion 2332 of the second input conductive element 233 and the second portion 2342 of the second ground conductive element 234 overlap with each other, between which only the thickness of the insulation layer is presented, so that the loop area between the conductive elements is small, and the parasitic inductance is low. The first portion 2331 of the second input conductive element 233 is staggered and non-overlapping with the first portion 2341 of the second ground conductive element 234 on the first surface of the magnetic core, the third portion 2333 of the second input conductive element 233 is staggered and non-overlapping with the third portion 2343 of the second ground conductive element 234 on the second surface of the magnetic core, such that the magnetic flux in the loop formed by the first portions 2331, 2341 on the first surface and the magnetic flux in the loop formed by the third portions 2333, 2343 on the second surface offset each other, thereby further reducing the parasitic inductance of the whole loop.

In this embodiment, the second portions of the conductive elements are overlapped and the first portions and the third portions are staggered to reduce the parasitic inductance in the loop of the conductive elements, so as to improve the efficiency.

The Seventh Embodiment

Figure 12A:
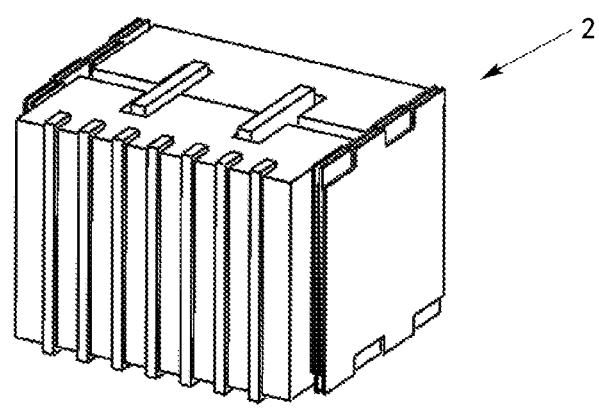
FIG. 12a is an assembling view of the power supply module according to the seventh embodiment of this disclosure, in which an integrated power module is omitted.
Figure 12B:
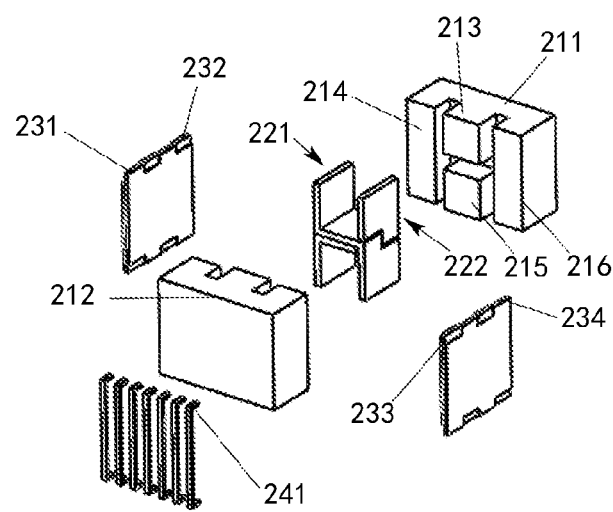
Figure 12C:
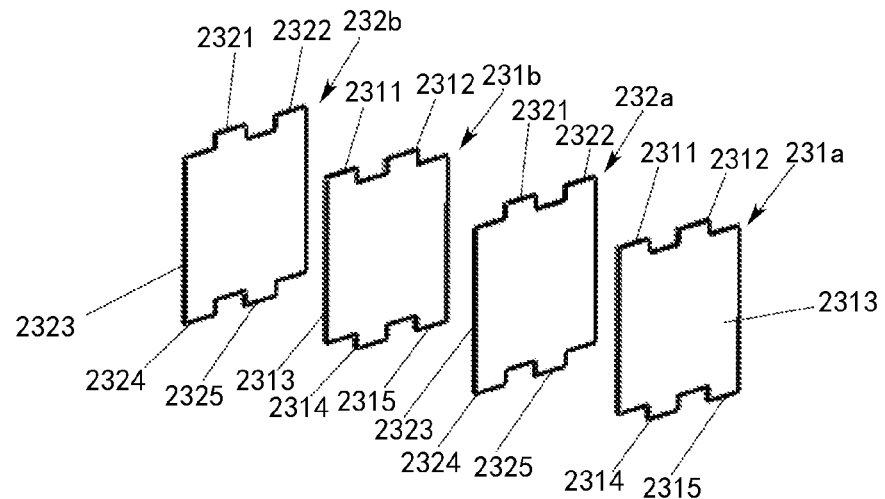
Figure 12D:
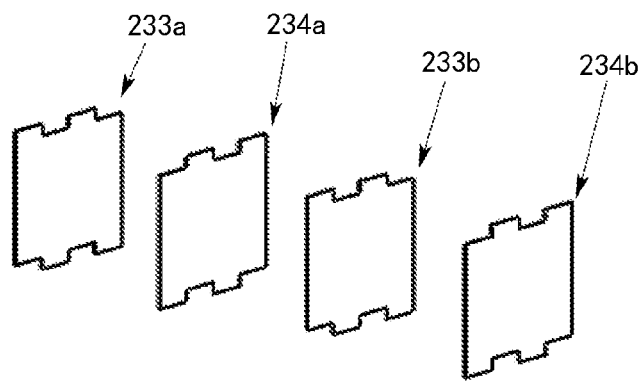

Referring to FIG. 12a to FIG. 12d, FIG. 12a is an assembling view of the power supply module according to the seventh embodiment of this disclosure, in which an integrated power module is omitted; FIG. 12b is an exploded view of FIG. 12a; FIG. 12c is an exploded view of the first power connection assembly in the power supply module in FIG. 12a. FIG. 12d is an exploded view of the second power connection assembly in the power supply module in FIG. 12a. As shown in FIGS. 12a and 12b, the difference of the power supply module of the seventh embodiment in comparison with the first embodiment lies in the specific structure of the conductive element.

As shown in FIGS. 12b and 12c, a first power connection assembly and a second power connection assembly arranged on the opposite sides of the magnetic core are included in the seventh embodiment. The first power connection assembly includes a first input conductive element 231a, a second input conductive element 231b, a first ground conductive element 232a, and a second ground conductive element 232b. The shape of the first input conductive element 231a is same as the shape of the second input conductive element 231b. Each of the first input conductive element 231a and the second input conductive element 231b contains a first portion 2311, a second portion 2312, a third portion 2313, a fourth portion 2314 and a fifth portion 2315. In each of the first input conductive element 231a and the second input conductive element 231b, the first portion 2311 and the second portion 2312 are connected to the upper side of the third portion 2313, the fourth portion 2314 and a fifth portion 2315 are connected to the lower side of the third portion 2313. The shape of the first ground conductive element 232a is same as the shape of the second ground conductive element 232b. Each of the first ground conductive element 232a and the second ground conductive element 232b contains a first portion 2321, a second portion 2322, a third portion 2323, a fourth portion 2324 and a fifth portion 2325. In each of the first ground conductive element 232a and the second ground conductive element 232b, the first portion 2321 and the second portion 2322 are connected to the upper side of the third portion 2323, the fourth portion 2324 and a fifth portion 2325 are connected to the lower side of the third portion 2323.

The input conductive element and the ground conductive element are alternatively disposed. For example, the first input conductive element 231a, the first ground conductive element 232a, the second input conductive element 231b and the second ground conductive element 232b are disposed in sequence. The first portions 2311 and the second portions 2312 of the first input conductive element 231a and the second input conductive element 231b are staggered and non-overlapping with the first portions 2321 and the second portions 2322 of the first ground conductive element 232a and the second ground conductive element 232b on the first surface of the magnetic core, and each of them forms pin on the first surface of the magnetic core. The fourth portions 2314 and the fifth portions 2315 of the first input conductive element 231a and the second input conductive element 231b are staggered and non-overlapping with the fourth portions 2324 and the fifth portions 2325 of the first ground conductive element 232a and the second ground conductive element 232b on the second surface of the magnetic core, and each of them forms pin on the second surface of the magnetic core. The third portion 2313 of the first input conductive element 231a, the third portion 2323 of the first ground conductive element 232a, the third portion 2313 of the second input conductive element 231b, and the third portion 2323 of the second ground conductive element 232b are overlapped. Since the directions of the current in the input conductive element and the ground conductive element are opposite, the alternative arrangement of the input conductive element and the ground conductive element helps to reduce the parasitic inductance, and generally such alternative arrangement of the multi-layer conductive elements can be easily achieved by a printed circuit board (PCB) process.

As shown in FIG. 12d, the second power connection assembly includes a third input conductive element 233a, a fourth input conductive element 233b, a third ground conductive element 234a and a fourth ground conductive element 234b. The setting mode of the third input conductive element 233a, the fourth input conductive element 233b, the third ground conductive element 234a and the fourth ground conductive element 234b is basically the same as the setting mode of the first input conductive element 231a, the second input conductive element 231b, the first ground conductive element 232a and the second ground conductive element 232b as shown in FIG. 12c, which will not be described herein.

The Eighth Embodiment

Figure 13A:
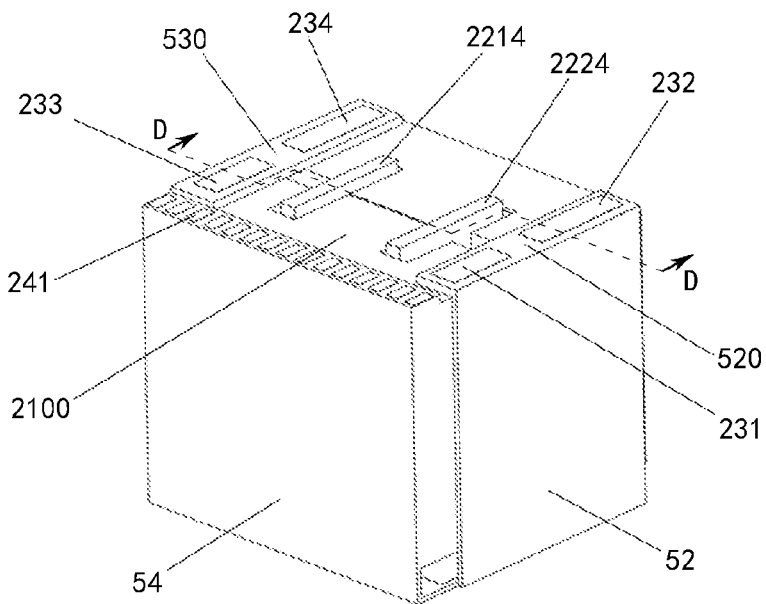
FIG. 13a is an assembling view of the power supply module according to the eighth embodiment of this disclosure, in which an integrated power module is omitted.
Figure 13B:
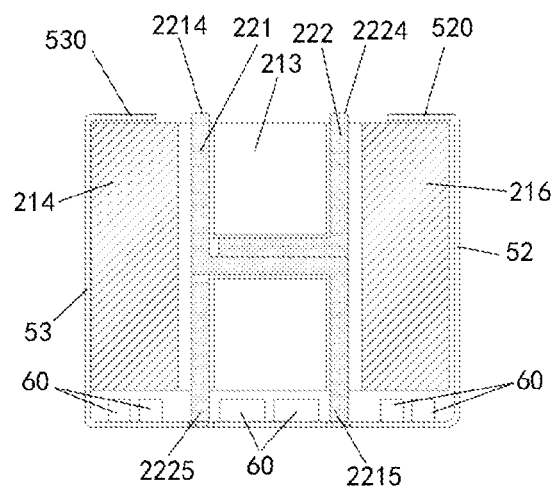
Figure 13C:
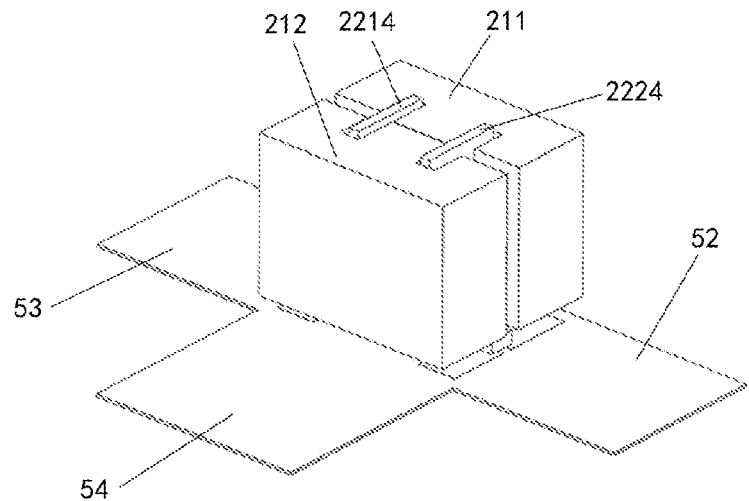
Figure 13D:
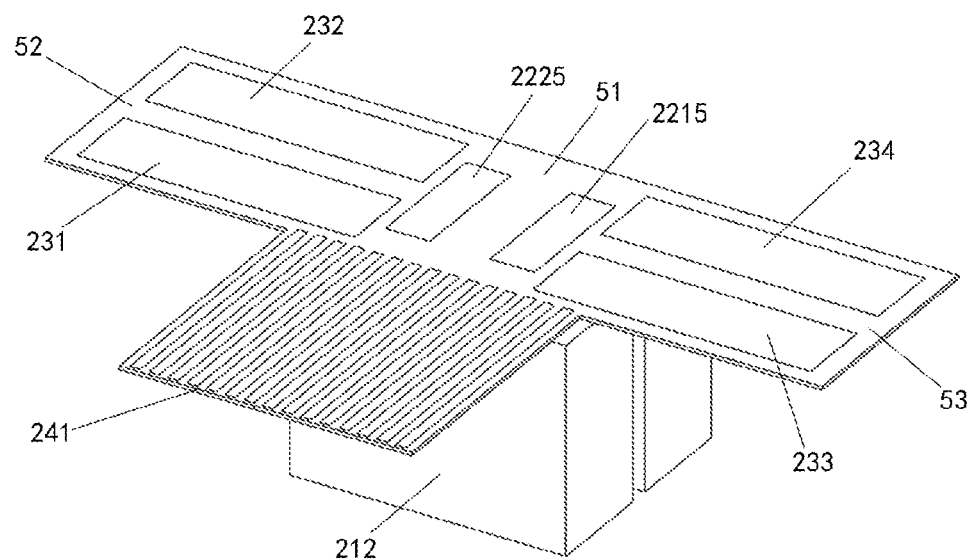

Referring to FIG. 13a to FIG. 13d, FIG. 13a is an assembling view of the power supply module according to the eighth embodiment of this disclosure, in which an integrated power module is omitted; FIG. 13b is a sectional view taken along the line D-D in FIG. 13a; FIG. 13c is a schematic structural view of a bendable substrate without being folded in FIG. 13a; FIG. 13d is a schematic structural view at another angle of a bendable substrate without being folded in FIG. 13a.

As shown in FIGS. 13a and 13b, the multi-winding inductor structure in the power supply module of the eighth embodiment is basically the same as that in the first embodiment, including a magnetic core and a winding. The magnetic core includes a first cover plate 211 and a second cover plate 212 arranged oppositely, and a first magnetic column 213, a second magnetic column 214, a third magnetic column 215 and a fourth magnetic column 216 connected to the first cover plate 211 and the second cover plate 212. The winding includes a first winding 221 and a second winding 222 arranged crosswise. The first winding 221 forms a first pin 2214 on the first surface of the magnetic core and a second pin 2215 on the second surface of the magnetic core, respectively; and the second winding 222 forms a third pin 2224 on the first surface of the magnetic core and a fourth pin 2225 on the second surface of the magnetic core, respectively.

The difference of the power supply module of the eighth embodiment in comparison with that of the first embodiment lies in further including a bendable substrate, on which the conductive elements and the like are arranged.

As shown in FIGS. 13b and 13c, the bendable substrate includes a bottom plate 51, a first side plate 52, a second side plate 53 and a third side plate 54, which are formed by bending and extending the sides of the bottom plate 51. The first side plate 52 and the second side plate 53 are arranged oppositely. The first side plate 52 is attached to the outer side of the fourth magnetic column 216 of the magnetic core, the second side plate 53 is attached to the outer side of the second magnetic column 214 of the magnetic core, and the third side plate 54 is attached to the outer side of the second cover plate 212 or the first cover 211 of the magnetic core. The upper end portion of the first side plate 52 and the upper end portion of the second side plate 53 extend to the first surface 2100 of the magnetic core so as to form a first extension 520 and a second extension 530, respectively.

As shown in FIG. 13b, the bottom plate 51 of the bendable substrate is provided with the second pin 2215 and the fourth pin 2225. The lower end portion of the first winding 221 may be connected to the second pin 2215 through a wiring inside the bottom plate 51 of the bendable substrate; a lower end portion of the second winding 222 may be connected to the fourth pin 2225 through the wiring inside the bottom plate 51 of the bendable substrate.

A signal conductive element 241 in the power supply module of the eighth embodiment may be directly arranged on the third side plate 54. A first power connection assembly including a first input conductive element 231 and a first ground conductive element 232 may be directly arranged on the first side plate 52. A second power connection assembly including a second input conductive element 233 and a second ground conductive element 234 may be arranged directly on the second side plate 53. An output capacitor 60 may also be arranged on the bottom plate 51. The output capacitor 60 is located between the bottom plate 51 and the magnetic core.

Compared with the combined conductive element structure as shown in FIG. 12a, in the eighth embodiment, the input conductive element, the ground conductive element and the signal conductive element may be formed simultaneously on the bendable substrate in advance, so that the conductive element can achieve high accuracy, including a dimensional accuracy and a relative position accuracy. The bendable substrate is made by a PCB process or a flexible PCB process which can achieve the high dimensional accuracy and the relative position accuracy.

As shown in FIG. 13b, in the eighth embodiment, the output capacitor is arranged between the lower surface of the multi-winding inductor and the bendable substrate, so that the number of the output capacitors on the user mainboard can be reduced, to save the space occupied by the output capacitors on the user mainboard, and also shorten a distance between the power supply module's output and the load, thereby reducing the transmission loss between the power supply module and the load, and improving the efficiency of the power supply module.

Optionally, it is also possible to partially arrange the input capacitor between the lower surface of the multi-winding inductor and the bendable substrate. Compared with setting the input capacitors on the integrated power module, the input capacitors are integrated into the multi-winding inductor to increase the number of the input capacitors, reduce a resonance between the input capacitor and the parasitic inductance, so as to reduce the loss and improve the efficiency.

The capacitors can also be arranged between the upper surface of the multi-winding inductor and the bendable substrate like between the lower surface of the multi-winding inductor and the bendable substrate.

Embodiments of this disclosure have the following advantages or advantageous effects: In the multi-winding inductor of this disclosure, one end of the winding extends to the first surface of the magnetic core and can form pins on the first surface, so as to directly connect with the integrated power module electrically, thereby improving the efficiency of the multi-winding inductor while maximizing the heat dissipation effect. In detail, in one embodiment, the multi-winding inductor has only three magnetic columns, the equivalent magnetic path sectional area of each of the magnetic columns is large, and loss of the magnetic core is reduced, thereby improving the efficiency of the multi-winding inductor while the magnetic core has a simple structure and is easy to manufacture. In another one embodiment, the width of the winding of the multi-winding inductor is larger than the thickness thereof, which is beneficial to reduce the connection path between the pins of the multi-winding inductor and the switch node pad in the integrated power module, and reduce the connection impedance, thereby improving the efficiency of the multi-winding inductor.

In the embodiments of this disclosure, the terms "first" and "second" are merely used for the purpose of description and cannot be interpreted to indicate or imply relative importance; the term "a plurality of" refers to two or more, unless otherwise explicitly defined; the terms "install", "connect with", "connect to" and "fix" shall be broadly understood, for example, "connect to" may be a fixed connection, a detachable connection, or an integrated connection; "connect with" may be direct connection or indirect connection through an intermediate media. For the skilled person in the art, the specific meanings of the above terms in the embodiments of the present disclosure can be understood depending on specific context.

In the description of the embodiments of this disclosure, it should be understood that an orientation or position relations indicated by the terms "up", "down", "left", "right", "before" and "after" are based on the orientation or position relations as shown in the drawings, in order for the convenience of describing the embodiments and simplifying the description, rather than indicating or implying that the device or the unit as indicated must have a particular orientation and can be constructed and operated in a particular orientation, so that it cannot be understood as limiting the embodiments of this disclosure.

In the description of this specification, the description of the terms "one embodiment", "some embodiments" and "specific embodiments", etc., is directed to that specific features, structures, materials or features described in combination with the embodiment or example are contained in at least one of the embodiments or examples of this disclosure. In this specification, illustrative expressions of the above terms do not necessarily refer to the same embodiments or examples. Furthermore, the specific features, structures, materials or features described may be combined in a suitable manner in one or more embodiments or examples.

The above are merely the preferred ones of the embodiments of this disclosure, and are not used to limit the embodiments of this disclosure. For the skilled person in the art, the embodiments of this disclosure can have various changes and variations. Any modification, equivalent substitution, improvement etc. made in the spirit and principle of the embodiments of this disclosure shall be included in the protection scope of the embodiments of this disclosure.

What is claimed is:

1. A multi-winding inductor, comprising:
   a magnetic core comprising a first cover plate, a second cover plate, a first magnetic column, a second magnetic column and a third magnetic column, the first cover plate and the second cover plate being arranged oppositely, the first magnetic column, the second magnetic column and the third magnetic column orderly arranged counterclockwise, and two ends of each of the first magnetic column, the second magnetic column and the third magnetic column being respectively connected to the first cover plate and the second cover plate, and
   a winding assembly comprising a first winding and a second winding; each of the first winding and the second winding comprising a first portion, a second portion and a third portion; wherein the first portion and the third portion are connected through the second portion in each of the first winding and the second winding; the first magnetic column is arranged between the first portion of the first winding and the first portion of the second winding; the second magnetic column is arranged on one side of the first portion of the first winding and the third portion of the second winding; and the third magnetic column is arranged between the third portion of the first winding and the third portion of the second winding;
   wherein the first portion of the first winding extends to a first surface of the magnetic core and forms a first pin of the multi-winding inductor on the first surface of the magnetic core; the third portion of the first winding extends to a second surface of the magnetic core and forms a second pin of the multi-winding inductor on the second surface of the magnetic core; the first portion of the second winding extends to the first surface of the magnetic core and forms a third pin of the multi-winding inductor on the first surface of the magnetic core; the third portion of the second winding extends to the second surface of the magnetic core and forms a fourth pin of the multi-wining inductor on the second surface of the magnetic core; and the first surface and the second surface of the magnetic core are arranged oppositely.

2. The multi-winding inductor of claim 1, wherein the first winding is provided with a notch or a hole, the second winding is provided with a notch or a hole, the first winding and the second winding are arranged crosswise through the notch or the hole such that the second portion of the first winding and the second portion of the second winding are overlapped.

3. The multi-winding inductor of claim 1, wherein the multi-winding inductor further comprises:
a fourth magnetic column, two ends of the fourth magnetic column are respectively connected with the first cover plate and the second cover plate; and the fourth magnetic column are arranged on one side of the third portion of the first winding and the first portion of the second winding.

4. The multi-winding inductor of claim 3, wherein the first magnetic column, the first cover plate, the third magnetic column and the second cover plate form a first magnetic path; the first cover plate, the second magnetic column, the second cover plate and the fourth magnetic column form a second magnetic path; and a total reluctance of the first magnetic path is less than a total reluctance of the second magnetic path.

5. The multi-winding inductor of claim 3, wherein the first magnetic column, the first cover plate, the third magnetic column and the second cover plate form a first magnetic path; the first cover plate, the second magnetic column, the second cover plate and the fourth magnetic column form a second magnetic path; and a total reluctance of the first magnetic path is greater than a total reluctance of the second magnetic path.

6. The multi-winding inductor of claim 3, wherein the first magnetic column, the first cover plate, the third magnetic column and the second cover plate form a first magnetic path; the first cover plate, the second magnetic column, the second cover plate and the fourth magnetic column form a second magnetic path; and a total reluctance of the first magnetic path is equal to a total reluctance of the second magnetic path.

7. The multi-winding inductor of claim 4, wherein the total length of air gaps in the first magnetic path is less than the total length of air gaps in the second magnetic path.

8. The multi-winding inductor of claim 4, wherein a magnetic permeability of at least part of a magnetic material in the second magnetic column and the fourth magnetic column is lower than a magnetic permeability of a magnetic material in the first magnetic column and the third magnetic column.

9. The multi-winding inductor of claim 4, wherein the magnetic core is formed by one magnetic material, and a ratio of an equivalent magnetic path length to an equivalent magnetic sectional area of the first magnetic path is less than a ratio of an equivalent magnetic path length to an equivalent magnetic sectional area of the second magnetic path.

10. The multi-winding inductor of claim 1, wherein the first winding and the second winding are respectively a flat wire with a width and a thickness, the thickness is less than the width, wherein a width direction is parallel to an extension direction of the first magnetic column.

11. A power supply module, comprising:
the multi-winding inductor according to claim 1; and
an integrated power module stacked on a first surface of the multi-winding inductor and comprising at least a first switching unit and a second switching unit,
wherein the first switching unit is electrically connected with the first pin of the multi-winding inductor, and the second switching unit is electrically connected with the third pin of the multi-winding inductor.

12. The power supply module of claim 11, wherein the first switching unit and the second switching unit respectively have a rectangular shape, a length direction of the first switching unit and a length direction of the second switching unit are in consistent with a width direction of the first winding and a width direction of the second winding, and the width direction of the first winding and the width direction of the second winding are parallel to an extension direction of the first magnetic column.

13. The power supply module of claim 11, wherein the power supply module further comprises a plurality of conductive elements arranged around the magnetic core, and each of the conductive elements comprises a first end and a second end, the first end forms a fifth pin on the first surface of the magnetic core, and the second end forms a sixth pin on the second surface of the magnetic core.

14. The power supply module of claim 13, wherein the plurality of conductive elements comprises:
at least two groups of power connection assemblies respectively arranged on a first side and a second side of the multi-winding inductor, wherein the first side and the second side are arranged oppositely; and
a signal connection assembly comprising a plurality of signal conductive elements and arranged on a third side and/or a fourth side of the multi-winding inductor.

15. The power supply module of claim 14, wherein each group of the power connection assemblies comprises an input conductive element and a ground conductive element; each of the input conductive element and the ground conductive element comprises a first portion, a second portion and a third portion orderly connected; wherein the second portion is arranged on a side of the multi-winding inductor, and the first portion and the third portion respectively extend to the first surface and the second surface of the multi-winding inductor;
wherein the input conductive element and the ground conductive element in each group of the power connection assemblies are arranged side by side.

16. The power supply module of claim 15, wherein
the first portions of the input conductive element and the ground conductive element in each group of the power connection assemblies are staggered;
the third portions of the input conductive element and the ground conductive element in each group of the power connection assemblies are staggered; and
the second portions of the input conductive element and the ground conductive element in each group of the power connection assemblies are overlapped.

17. The power supply module of claim 14, wherein each group of the power connection assemblies comprises at least two input conductive elements and at least two ground conductive elements;
wherein each of the input conductive elements and the ground conductive elements comprises at least two first portions, one second portion and at least two third portions, and the at least two first portions and the at least two third portions are respectively extending from two ends of the second portion;

wherein the second portions of the at least two input conductive elements and the second portions of the at least two ground conductive elements are alternately overlapped on the side of the multi-winding inductor, the first portions respectively extend to the first surface of the multi-winding inductor, and the third portions respectively extend to the second surface of the multi-winding inductor;

the at least two first portions of the input conductive element and the at least two first portions of the ground conductive element adjacent to the input conductive element are staggered; and the at least two third portions of the input conductive element and the at least two third portions of the ground conductive element adjacent the input conductive element are staggered.

18. The power supply module of claim 13, wherein the power supply module further comprises:

a bendable substrate, the plurality of conductive elements are arranged on the bendable substrate.

19. The power supply module of claim 18, wherein the bendable substrate comprises a bottom plate, a first side plate, a second side plate and a third side plate, the first side plate, the second side plate and the third side plate are formed by bending and extending the bottom plate, wherein the first side plate and the second side plate are arranged oppositely;

wherein the plurality of conductive elements comprises a signal connection assembly and at least two groups of power connection assemblies, the at least two groups of power connection assemblies are respectively arranged on the first side plate and the second side plate, and the signal connection assembly is arranged on the third side plate.

20. The power supply module of claim 19, wherein the power supply module further comprises an output capacitor arranged on the bottom plate and located between the second surface of the magnetic core and the bottom plate.

* * * * *